(12) United States Patent
Apte

(10) Patent No.: US 10,082,104 B2
(45) Date of Patent: Sep. 25, 2018

(54) ATMOSPHERIC STORAGE AND TRANSFER OF THERMAL ENERGY

(71) Applicant: X Development LLC, Mountain View, CA (US)

(72) Inventor: Raj B. Apte, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 85 days.

(21) Appl. No.: 15/395,040

(22) Filed: Dec. 30, 2016

(65) Prior Publication Data

US 2018/0187628 A1    Jul. 5, 2018

(51) Int. Cl.
| | |
|---|---|
| *F02G 1/055* | (2006.01) |
| *F02C 1/10* | (2006.01) |
| *F28D 20/00* | (2006.01) |
| *F02G 1/053* | (2006.01) |

(52) U.S. Cl.
CPC ............... *F02G 1/055* (2013.01); *F02C 1/10* (2013.01); *F02G 1/0535* (2013.01); *F28D 20/0056* (2013.01); *F02G 2250/03* (2013.01); *F28D 2020/0078* (2013.01); *F28D 2020/0082* (2013.01)

(58) Field of Classification Search
CPC .... F02G 1/055; F02G 1/0535; F02G 2250/03; F02C 1/10; F28D 20/0056; F28D 2020/0082; F28D 2020/0078
USPC .................................. 60/650, 682–684, 659
See application file for complete search history.

(56) References Cited

U.S. PATENT DOCUMENTS

| | | | |
|---|---|---|---|
| 2,065,974 A | 12/1936 | Marguerre | |
| 2,246,513 A | 6/1941 | Hammond | |
| 2,791,204 A | 5/1957 | Andrus | |
| 2,860,493 A | 11/1958 | Capps et al. | |
| 3,152,442 A | 10/1964 | Rowekamp | |
| 3,220,191 A | 11/1965 | Berchtold | |
| 3,630,022 A | 12/1971 | Jubb | |
| 3,897,170 A | 7/1975 | Darvishian | |
| 3,955,359 A * | 5/1976 | Yannone | F02C 9/28 290/40 R |
| 4,024,908 A | 5/1977 | Meckler | |
| 4,054,124 A | 10/1977 | Knoos | |
| 4,089,744 A | 5/1978 | Cahn | |

(Continued)

FOREIGN PATENT DOCUMENTS

| | | |
|---|---|---|
| DE | 202013004654 | 8/2014 |
| EP | 0003980 A1 | 9/1979 |

(Continued)

OTHER PUBLICATIONS

Desrues et al., "A Thermal Energy Storage Process for Large Scale Electric Applications", Applied Thermal Engineering 30 (2010): 425-432, Oct. 14, 2009.

(Continued)

*Primary Examiner* — Hoang Nguyen
(74) *Attorney, Agent, or Firm* — McDonnell Boehnen Hulbert & Berghoff LLP

(57) ABSTRACT

A heat engine system with pressure-regulating load-locks disposed between thermal medium storage containers and heat exchangers is disclosed. A load-lock connects one or more storage containers at atmospheric pressure to one or more heat exchangers at greater than or less than atmospheric pressure.

20 Claims, 10 Drawing Sheets

(56) References Cited

U.S. PATENT DOCUMENTS

| | | | |
|---|---|---|---|
| 4,094,148 A | 6/1978 | Nelson | |
| 4,110,987 A | 9/1978 | Cahn et al. | |
| 4,148,191 A | 4/1979 | Frutschi | |
| 4,158,384 A | 6/1979 | Brautigam | |
| 4,215,553 A | 8/1980 | Poirier et al. | |
| 4,408,654 A | 10/1983 | Doomernik | |
| 4,430,241 A | 2/1984 | Fiorucci | |
| 4,444,024 A | 4/1984 | McFee | |
| 4,438,630 A | 10/1984 | Yamaoka et al. | |
| 4,479,352 A | 10/1984 | Yamaoka et al. | |
| 4,523,629 A | 6/1985 | Copeland | |
| 4,583,372 A | 4/1986 | Egan et al. | |
| 4,628,692 A | 12/1986 | Pierce | |
| 4,643,212 A | 2/1987 | Rothrock | |
| 4,727,930 A | 3/1988 | Bruckner et al. | |
| 5,269,145 A | 12/1993 | Krause et al. | |
| 5,537,822 A | 7/1996 | Shnaid et al. | |
| 5,644,928 A | 7/1997 | Uda et al. | |
| 5,653,656 A | 8/1997 | Thomas et al. | |
| 5,653,670 A | 8/1997 | Endelman | |
| 6,119,682 A | 9/2000 | Hazan | |
| 6,250,869 B1 | 6/2001 | Kroeker | |
| 6,338,626 B1 | 1/2002 | Saeki | |
| 6,629,413 B1 | 10/2003 | Wendt et al. | |
| 6,644,062 B1 | 11/2003 | Hays | |
| 6,701,711 B1 | 3/2004 | Litwin | |
| 7,028,481 B1 | 4/2006 | Morrow | |
| 7,086,231 B2 | 8/2006 | Pinkerton | |
| 7,207,766 B2 | 4/2007 | Kurita et al. | |
| 7,299,633 B2 | 11/2007 | Murphy et al. | |
| 7,381,969 B2 | 6/2008 | Fasheh et al. | |
| 7,458,418 B2 | 12/2008 | Sienel | |
| 7,603,858 B2 | 10/2009 | Bennett | |
| 7,937,930 B1 | 5/2011 | Dunn | |
| 7,954,320 B2 | 6/2011 | Ellensohn et al. | |
| 8,113,011 B2 | 2/2012 | Howes et al. | |
| 8,206,075 B2* | 6/2012 | White | H01L 21/67201 118/715 |
| 8,403,613 B2* | 3/2013 | van der Meulen | B65G 25/02 414/217 |
| 8,424,284 B2 | 4/2013 | Staffend et al. | |
| 8,453,677 B2 | 6/2013 | Howes et al. | |
| 8,496,026 B2 | 7/2013 | Howes et al. | |
| 8,500,388 B2* | 8/2013 | van der Meulen | B65G 25/02 414/805 |
| 8,613,195 B2 | 12/2013 | Held et al. | |
| 8,656,712 B2 | 2/2014 | Howes et al. | |
| 8,671,686 B2 | 3/2014 | Pinkerton et al. | |
| 8,826,664 B2 | 9/2014 | Howes et al. | |
| 8,833,079 B2 | 9/2014 | Smith | |
| 8,833,101 B2 | 9/2014 | Howes et al. | |
| 8,863,641 B2 | 10/2014 | Howes | |
| 8,904,793 B2 | 12/2014 | Hemrle et al. | |
| 9,316,121 B2 | 4/2016 | Davidson et al. | |
| 9,518,786 B2 | 12/2016 | Howes et al. | |
| 2001/0054449 A1 | 12/2001 | Jones et al. | |
| 2003/0131623 A1 | 7/2003 | Suppes | |
| 2004/0008010 A1 | 1/2004 | Ebrahim et al. | |
| 2004/0083731 A1 | 5/2004 | Lasker | |
| 2004/0088980 A1 | 5/2004 | Emmel et al. | |
| 2005/0126171 A1 | 6/2005 | Lasker | |
| 2006/0035591 A1 | 2/2006 | Young et al. | |
| 2006/0053792 A1 | 3/2006 | Bourgeois | |
| 2006/0137869 A1 | 6/2006 | Steinhauser | |
| 2006/0185626 A1 | 8/2006 | Allen et al. | |
| 2006/0248886 A1 | 11/2006 | Ma | |
| 2007/0295673 A1 | 12/2007 | Enis et al. | |
| 2008/0121387 A1 | 5/2008 | Taniguchi et al. | |
| 2009/0126377 A1 | 5/2009 | Shibata et al. | |
| 2009/0179429 A1 | 7/2009 | Ellis et al. | |
| 2010/0024421 A1 | 2/2010 | Litwin et al. | |
| 2010/0251711 A1 | 10/2010 | Howes et al. | |
| 2010/0251712 A1 | 10/2010 | Nakhamkin | |
| 2010/0257862 A1 | 10/2010 | Howes et al. | |
| 2010/0275616 A1 | 11/2010 | Saji et al. | |
| 2010/0301062 A1 | 12/2010 | Litwin et al. | |
| 2010/0301614 A1 | 12/2010 | Ruer | |
| 2011/0100010 A1 | 5/2011 | Freund et al. | |
| 2011/0100011 A1 | 5/2011 | Staffend | |
| 2011/0100356 A1 | 5/2011 | Bliesner | |
| 2011/0100611 A1 | 5/2011 | Ohler et al. | |
| 2011/0126539 A1 | 6/2011 | Ramaswamy et al. | |
| 2011/0139407 A1 | 6/2011 | Ohler et al. | |
| 2011/0196542 A1 | 8/2011 | Pinkerton et al. | |
| 2011/0227066 A1 | 9/2011 | Umezaki | |
| 2011/0262269 A1 | 10/2011 | Lior | |
| 2011/0277471 A1 | 11/2011 | Shinnar | |
| 2011/0283700 A1 | 11/2011 | Zohar et al. | |
| 2011/0289941 A1 | 12/2011 | Gonzalez et al. | |
| 2011/0314839 A1 | 12/2011 | Brook et al. | |
| 2012/0039701 A1 | 2/2012 | Diddi et al. | |
| 2012/0047892 A1 | 3/2012 | Held et al. | |
| 2012/0055661 A1 | 3/2012 | Feher | |
| 2012/0060501 A1 | 3/2012 | Hemrle et al. | |
| 2012/0222423 A1 | 9/2012 | Mercangoez et al. | |
| 2012/0267955 A1 | 10/2012 | Zhan et al. | |
| 2012/0312496 A1 | 12/2012 | Howes et al. | |
| 2012/0319410 A1 | 12/2012 | Ambrosek et al. | |
| 2013/0197704 A1 | 4/2013 | Pan et al. | |
| 2013/0105127 A1 | 5/2013 | Postma et al. | |
| 2013/0118344 A1 | 5/2013 | Howes et al. | |
| 2013/0125546 A1 | 5/2013 | Barmeier et al. | |
| 2013/0276917 A1 | 10/2013 | Howes et al. | |
| 2014/0008033 A1 | 1/2014 | Howes et al. | |
| 2014/0014290 A1 | 1/2014 | Howes et al. | |
| 2014/0014302 A1* | 1/2014 | Gutai | F24J 2/0444 165/104.19 |
| 2014/0060051 A1 | 3/2014 | Ohler et al. | |
| 2014/0075970 A1 | 3/2014 | Benson | |
| 2015/0034188 A1 | 2/2015 | Howes | |
| 2015/0069758 A1 | 3/2015 | Davidson et al. | |
| 2015/0084567 A1 | 3/2015 | Howes | |
| 2015/0113940 A1 | 4/2015 | Sinatov et al. | |
| 2015/0114217 A1 | 4/2015 | Howes | |
| 2015/0114591 A1 | 4/2015 | Howes et al. | |
| 2015/0211386 A1 | 7/2015 | Howes et al. | |
| 2015/0260463 A1 | 9/2015 | Laughlin et al. | |
| 2015/0267612 A1 | 9/2015 | Bannari | |
| 2015/0361832 A1 | 12/2015 | Franke et al. | |
| 2016/0018134 A1 | 1/2016 | Ueda et al. | |
| 2016/0030856 A1 | 2/2016 | Kaplan et al. | |
| 2016/0032783 A1 | 2/2016 | Howes et al. | |
| 2016/0248299 A1 | 8/2016 | Ouvry | |
| 2016/0290281 A1 | 10/2016 | Schmatz | |
| 2016/0298455 A1 | 10/2016 | Laughlin | |
| 2016/0298495 A1 | 10/2016 | Laughlin | |

FOREIGN PATENT DOCUMENTS

| | | |
|---|---|---|
| EP | 1577548 A1 | 9/2005 |
| EP | 1857614 A2 | 11/2007 |
| EP | 2241737 A1 | 10/2010 |
| EP | 2275649 A1 | 1/2011 |
| EP | 2312129 A1 | 4/2011 |
| EP | 2390473 A1 | 11/2011 |
| EP | 2400120 A1 | 12/2011 |
| EP | 2441925 A1 | 4/2012 |
| EP | 2441926 A1 | 4/2012 |
| EP | 2552843 A1 | 12/2012 |
| JP | 08-93633 A | 4/1996 |
| JP | 2011106755 | 6/2011 |
| KR | 1020040045337 | 6/2004 |
| KR | 1020120042921 | 5/2012 |
| KR | 101370843 | 3/2014 |
| KR | 1020150089110 | 8/2015 |
| WO | 2005/019756 | 3/2005 |
| WO | 2011/161094 | 12/2011 |
| WO | 2013/094905 | 6/2013 |
| WO | 2013164563 A1 | 11/2013 |

(56) References Cited

FOREIGN PATENT DOCUMENTS

| WO | 2015/185891 | 10/2015 |
|----|-------------|---------|
| WO | 2016/000016 | 1/2016  |

OTHER PUBLICATIONS

Ruer et al., "Pumped Heat Energy Storage", pp. 1-14, Apr. 2010.
Bauer et al., "Sodium nitrate for high temperature latent heat storage", 11th International Conference,Thermal Energy Storage Effstock, Jun. 14, 2009.
Bradshaw et al., "Molten Nitrate Salt Development for Thermal Energy Storage inParabolic Trough Solar Power Systems", ES2008-54174, ASME 2008 2nd International Conference on Energy Sustainability, vol. 2, (2008), p. 631.
Dewing, Ernest W., "Heat Capacities of Liquid Sodium and Potassium Nitrates", Journal of Chemical and Engineering Data, 1975; 20(3): 221-223.
Diguilio et al., "The Thermal Conductivity of the Molten NaN03-KN03 Eutectic Between 525 and 590 K", International Journal of Thermophysics, 1992; 13(4):575-592.
Freeman, Eli S., "The Kinetics of the Thermal Decomposition of Sodium Nitrate and of the Reaction Between Sodium Nitrate and Oxygen", J. Ohys. Chern., Nov. 1956, 60(11)1487-1493.
Isentropic, "A new era in electrical energy storage and recovery", 2014, <http://www.isentropic.co.uk/our-phes-technology>.
Laughlin, Robert, "Here Comes the Sun", Stanford Physics Department Colloquium, Jan. 5, 2010.
Nunes et al., "Viscosity of Molten Sodium Nitrate", International Journal of Thermophysics, 2006; 27(6):1638-1649.
Parsons, "Cost Estimates for Thermal Peaking Power Plant", Parsons Brinckerhoff New Zealand Ltd., 2008.
Peng et al., "High-temperature thermal stability of molten salt materials", Int. J. Energy Res., 2008; 32:1164-1174.
Pickett, et al., "Heated Turbulent Flow of Helium-Argon Mixtures in Tubes", International Journal of Heat and Mass Transfer, 22:705-719, 1979.
Raade, et al., "Development of Molten Salt Heat Transfer Fluid With Low Melting Point and High Thermal Stability", Journal of Solar Energy Engineering, 133:031013-1-031013-6, 2011.
Silverman, et al., "Survey of Technology for Storage of Thermal Energy in Heat Transfer Salt", Oak Ridge National Laboratory, ORNL/TM-5682, Jan. 1977.
Vanco, Michael R., "Analytical Comparison of Relative Heat-Transfer Coefficients and Pressure Drops of Inert Gases and Their Binary Mixtures", U.S. National Aeronautics and Space Administration, NASA TN D-2677, Feb. 1965.
Yergovich, et al., "Density and Viscosity of Aqueous Solutions of Methanol and Acetone from the Freezing Point to 10°C", Journal of Chemical and Engineering Data, 16(2):222-226, 1971.
Zabransky, et al., "Heat Capacities of Organic Compounds in the liquid State I. Cl to C18 1-Alkanols", Journal of Physical and Chemical Reference Data, 19(3):719-762, 1990.
Way, Julie, "Storing the Sun: Molten Salt Provides Highly Efficient Thermal Storage", <http://www.renewableenergyworld.com/articles/2008/06/storing-the-sun-molten-salt-provides-highly-efficient-thermal-storage-52873.html>, Jun. 26, 2008.
Wesoff, Eric, "Breakthrough in Energy Storage: Isentropic Energy", <https://www.greentechmedia.com/articles/read/breakthrough-in-utility-scale-energy-storage-isentropic>, Feb. 23, 2010.
Turchi, Craig, "NREL Advanced Concepts", Solar Energy Technologies Program Peer Review, May 27, 2010.
Boyce, Meherwan P., "Axial-Flow compressors", 2003 (date estimated), Internet.
Frutschi, Hans Ulrich, "Closed-Cycle Gas Turbines", New York, NY, ASME, 2005, <http://ebooks.asmedigitalcollection.asme.org/books.aspx>, Jan. 29, 2016.
Office action dated Mar. 28, 2013 for U.S. Appl. No. 12/932,775.
Office action dated Jan. 9, 2014 for U.S. Appl. No. 12/932,775.
Office action dated Feb. 26, 2015 for U.S. Appl. No. 12/932,775.
Office action dated Dec. 4, 2015 for U.S. Appl. No. 13/965,048.
Office action dated Nov. 6, 2015 for U.S. Appl. No. 12/932,775.
International search report and written opinion dated Jan. 2, 2014 for PCT/US2013/062469.
International preliminary report on patentability and written opinion dated Mar. 31, 2015 for PCT/U52013/062469.
MacNaghten, James, "Commercial potential of different large scale thermal storage technologies under development globally", Isentropic Ltd, Jun. 9, 2016.
U.S. Appl. No. 14/668,610, filed Mar. 25, 2015.
U.S. Appl. No. 13/965,048, filed Aug. 12, 2013.
U.S. Appl. No. 12/932,775, filed Mar. 4, 2011.
Patent Cooperation Treaty Application Serial No. PCT/US2013/062469, filed Sep. 27, 2013.
U.S. Appl. No. 61/706,337, filed Sep. 27, 2012.
U.S. Appl. No. 61/868,070, filed Aug. 20, 2013.
U.S. Appl. No. 61/339,577, filed Mar. 4, 2010.
U.S. Appl. No. 15/392,653, filed Dec. 28, 2016.
U.S. Appl. No. 15/392,542, filed Dec. 28, 2016.
U.S. Appl. No. 15/392,523, filed Dec. 28, 2016.
U.S. Appl. No. 15/392,927, filed Dec. 28, 2016.
U.S. Appl. No. 15/392,657, filed Dec. 28, 2016.
U.S. Appl. No. 15/392,571, filed Dec. 28, 2016.
U.S. Appl. No. 15/394,572, filed Dec. 29, 2016.
U.S. Appl. No. 15/393,891, filed Dec. 29, 2016.
U.S. Appl. No. 15/393,874, filed Dec. 29, 2016.
International Search Report and Written Opinion, International Application No. PCT/US2017/063289, dated Apr. 16, 2018.
Non-Final Rejection, U.S. Appl. No. 13/363,574, dated Feb. 8, 2018.
International Searching Authority, International Search Report and Written Opinion, dated Apr. 12, 2018, issued in connection with International Patent Application No. PCT/US2017/063519, field Nov. 28, 2017, 16 pages.
International Searching Authority, International Search Report and Written Opinion, dated Mar. 26, 2018, issued in connection with International Patent Application No. PCT/US2017/065645, filed Dec. 11, 2017, 16 pages.
International Searching Authority, International Search Report and Written Opinion, dated Mar. 27, 2018, issued in connection with International Patent Application No. PCT/US2017/065201, filed Dec. 7, 2017, 13 pages.
International Searching Authority, International Search Report and Written Opinion, dated Feb. 26, 2018, issued in connection with International Patent Application No. PCT/US2017/064074, filed Nov. 30, 2017, 13 pages.
International Searching Authority, International Search Report and Written Opinion, dated Mar. 26, 2018, issued in connection with International Patent Application No. PCT/US2017/065200, filed on Dec. 7, 2017, 15 pages.
International Searching Authority, International Search Report and Written Opinion, dated Mar. 20, 2018, issued in connection with International Patent Application No. PCT/US2017/064839, filed on Dec. 6, 2017, 13 pages.
International Searching Authority, International Search Report and Written Opinion, dated Mar. 29, 2018, issued in connection with International Patent Application No. PCT/US2017/065643, filed on Dec. 11, 2017, 17 pages.
International Searching Authority, International Search Report and Written Opinion, dated Feb. 22, 2018, issued in connection with International Patent Application No. PCT/US2017/062117, filed Nov. 17, 2017, 17 pages.
International Searching Authority, International Search Report and Written Opinion, dated Mar. 12, 2018, issued in connection with International Patent Application No. PCT/US2017/063521, filed Nov. 28, 2017, 18 pages.
International Searching Authority, International Search Report and Written Opinion, dated Mar. 29, 2018, issued in connection with International Patent Application No. PCT/US2017/067049, filed Dec. 18, 2017, 16 pages.
Non-Final Office Action dated May 14, 2018, issued in connection with U.S. Appl. No. 15/392,653, filed Dec. 28, 2016, 26 pages.

(56) References Cited

OTHER PUBLICATIONS

Non-Final Office Action dated Nov. 3, 2016, issued in connection with U.S. Appl. No. 12/932,775, filed Mar. 4, 2011, 17 pages.
Final Office Action dated Jul. 25, 2017, issued in connection with U.S. Appl. No. 12/932,775, filed Mar. 4, 2011, 19 pages.
Non-Final Office Action dated Feb. 8, 2018, issued in connection with U.S. Appl. No. 15/396,461, filed Dec. 31, 2016, 9 pages.
Non-Final Office Action dated May 14, 2018, issued in connection with U.S. Appl. No. 15/392,657, filed Dec. 28, 2016, 27 pages.
Apte et al., U.S. Appl. No. 15/395,622, filed Dec. 30, 2016, 101 pages.
Non-Final Office Action dated May 25, 2018, issued in connection with U.S. Appl. No. 15/393,874, filed Dec. 29, 2016, 28 pages.
Non-Final Office Action dated Jun. 28, 2018, issued in connection with U.S. Appl. No. 151392,927, filed Dec. 28, 2016, 11 pages.
Final Office Action dated Jun. 6, 2018, issued in connection with U.S. Appl. No. 15/396,461, filed Dec. 31, 2016, 10 pages.
International Searching Authority, International Search Report and Written Opinion dated Jul. 30, 2018, issued in connection with International Patent Application No. PCT/US2017/064076, filed Nov. 30, 2017, 15 pages.

\* cited by examiner

ATMOSPHERIC STORAGE AND TRANSFER OF THERMAL ENERGY

BACKGROUND

In a heat engine or heat pump, a heat exchanger may be employed to transfer heat between a thermal storage material to a working fluid for use with turbomachinery. If the heat engine is reversible, e.g., it may also be a heat pump, then the working fluid and heat exchanger may be used to transfer heat or cold to a plurality of thermal stores. The thermal energy within a given system may be stored in various forms and in a variety of containers, including pressure vessels and/or insulated vessels. For example, in solar thermal systems with storage, molten salt is commonly used to store thermal energy, while a heat exchanger is used to transfer that energy to steam or other working fluid suitable for driving turbomachinery. Thermal energy may also be stored in solids, for example in thermocline storage, where a working fluid is circulated directly over the solid material. Because the thermal storage functions as a direct-contact heat exchanger, the vessel that contains the thermal storage may be at the high inlet pressure, for example, 30 to 100 bar.

Power generation systems that utilize thermal energy storage, such as pebble-bed fission reactors and concentrated solar thermal, generally operate at high pressures and high temperatures In pebble bed fission reactors, because of the need for radiation containment, a pressure vessel containment system is normally surrounded by a secondary containment system to limit the danger of sudden pressure release. This increases cost relative to a single-containment system. In the case of concentrated solar, existing solutions commonly use multiple heat exchangers to transfer heat to high temperature and high pressure gas so that high pressure is not needed for the storage material; however, this results in inefficiency due to high approach temperatures and wasted heat.

SUMMARY

A load-lock may be used to transfer thermal storage medium at high temperature and atmospheric pressure into a high temperature, high pressure heat exchanger. The use of a load-lock permits the thermal medium to remain at atmospheric pressure during storage. Once needed, a bolus of thermal medium may be placed in the load-lock, sealed, pressurized, and transferred to a direct-contact heat exchanger, i.e., a vessel in which the working fluid passes directly over the solid medium. Cold medium may also be withdrawn from an exchanger, through a load-lock, and deposited into storage. These processes apply to both heat storage and cold storage, the latter which may be at partial vacuum. The various load-locks may utilize pressurizing and/or depressurizing systems and they may be coupled to each other or other components in a system to save energy by re-capturing pressure or they may be independent of each other. Beneficially, such a load-lock system may allow stored solid medium to remain at atmospheric pressure, regardless of temperature, which improves safety and cost.

In one aspect, a system may include a storage container. The storage container may store thermal medium at a first pressure. The system may further include a heat exchanger and the heat exchanger may contain thermal medium at a second pressure that is different than the first pressure. The system may further include a load-lock disposed between the storage container and the heat exchanger. The load-lock may include a holding section, a first pressure seal, and a second pressure seal. The holding section may be configured to hold a quantity of thermal medium. The first pressure seal may be disposed between the holding section and the storage container, and the load-lock may be configured such that when the first pressure seal is open, pressure may equilibrate between the holding section and the storage container and thermal medium may be transferred between the storage container and the holding section, and when the first pressure seal is closed, pressure may not equilibrate between the holding section and the storage container via the first pressure seal. The second pressure seal may be disposed between the holding section and the heat exchanger, and the load-lock may be configured such that when the second pressure seal is open, pressure may equilibrate between the holding section and the heat exchanger and thermal medium may be transferred between the heat exchanger and the holding section, and when the second pressure seal is closed, pressure may not equilibrate between the holding section and the heat exchanger via the second pressure seal.

In another aspect, a system may include a direct contact heat exchanger ("DCHE"), hot storage container ("HSC"), a load-lock. Within the DCHE, a cold working fluid may contact a hot solid thermal medium at greater than atmospheric pressure to form a hot working fluid and a cold thermal medium. Within the HSC, the hot solid thermal medium may be stored at atmospheric pressure. The load-lock may couple the DCHE and HSC, and may include a holding section for thermal storage medium, a first pressure seal between the holding section and the HSC, and a second pressure seal between the hot holding section and the DCHE. The load-lock may be configured to: receive hot solid thermal medium into the holding section from the HSC with the first pressure seal open and the second pressure seal closed, where the HSC is at atmospheric pressure; retain the hot solid thermal medium within the holding section with the first pressure seal closed and the second pressure seal closed; and dispatch hot thermal storage medium from the holding section to the DCHE with the first pressure seal closed and the second pressure seal open, where the DCHE is at greater than atmospheric pressure.

In a further aspect, a system may include a compressor, a turbine, a first heat exchanger operable at a first pressure, a second heat exchanger, a first thermal storage container operable at a second pressure different than the first pressure, a second thermal storage container, solid thermal medium, and a load-lock disposed between the first heat exchanger and the first thermal storage container. The load-lock may be operable to transfer solid thermal medium between the first heat exchanger and the first thermal storage container while preventing equilibration of pressure between the first heat exchanger and the first thermal storage container. The system may further include a working fluid. The working fluid may flow along a fluid flow path in a closed cycle including, in sequence, the compressor, the first heat exchanger, the turbine, and the second heat exchanger. The system may alternately operate as both (i) a heat engine to provide mechanical work from heat and (ii) as a heat pump to use mechanical work to store heat.

These as well as other aspects, advantages, and alternatives, will become apparent to those of ordinary skill in the art by reading the following detailed description, with reference where appropriate to the accompanying drawings.

DETAILED DESCRIPTION

Figure 1:
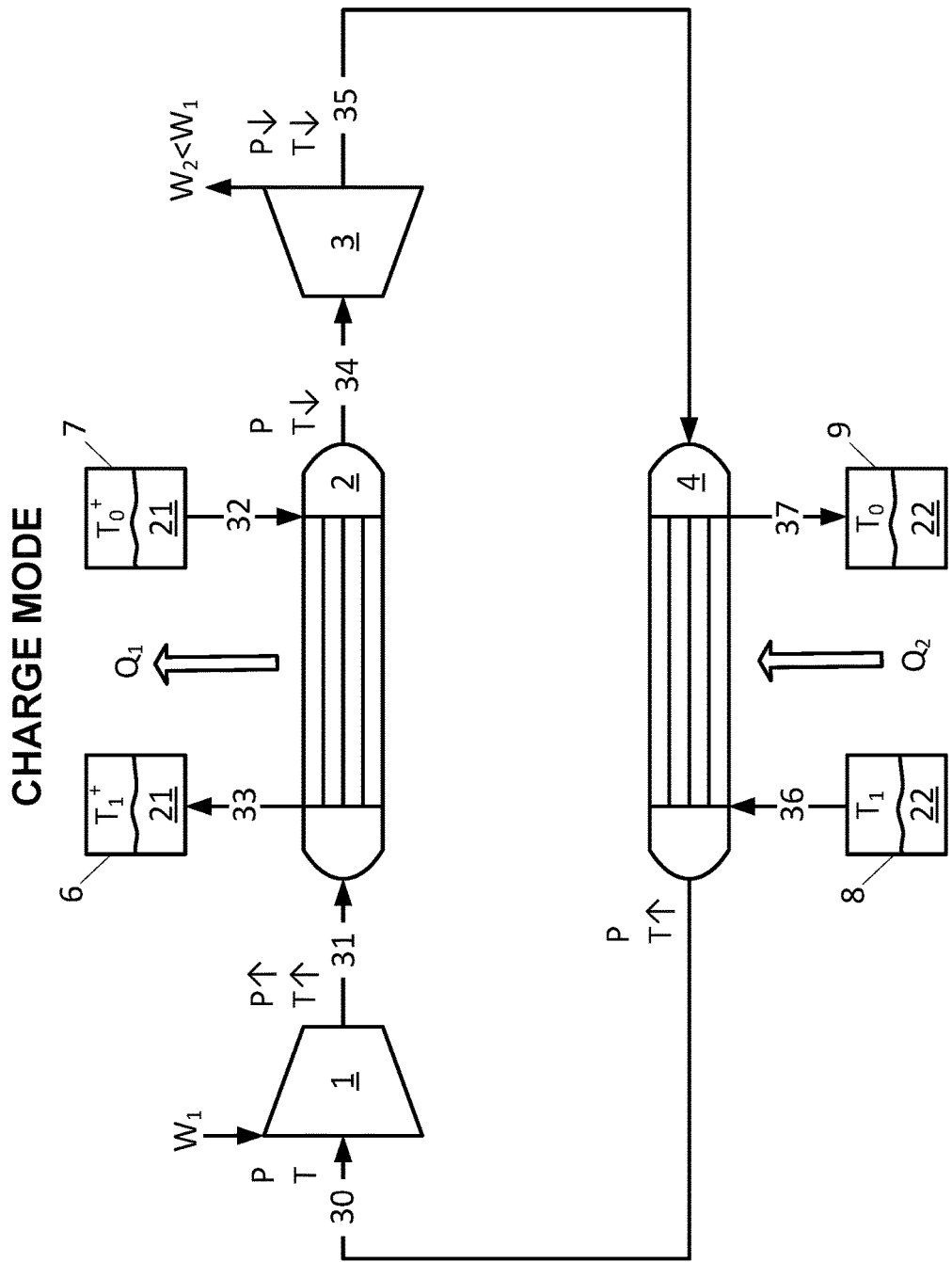
FIG. 1 is a schematic flow diagram of working fluid and heat storage media of a thermal system in a charge/heat pump mode.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

I. Overview

An example reversible closed heat engine in which pressure-sealing load-locks may implemented is a Brayton engine system. A Brayton engine system may use a generator/motor connected to a turbine and a compressor which act on a working fluid circulating in the system. Examples of working fluids include air, argon, carbon dioxide, or gaseous mixtures. A Brayton system may have a hot side or a cold side. Each side may include a heat exchanger coupled to one or more cold storage containers and/or one or more hot storage containers. Liquid thermal storage medium be utilized and may include, for example, liquids that are stable at high temperatures, such as molten nitrate salt or solar salt, or liquids that are stable at low temperatures, such as glycols or alkanes. However, for cost or other reasons, it may be desirable to employ solid thermal storage medium, such as sand, gravel, metallic balls, fissionable pellets. Previously, solid thermal storage medium has been stationary, with working fluid percolating through the solid medium. Pelletbed reactors or solid thermocline systems are examples. Stationary solid materials may suffer from thermal leakage, however, either from solid-contact conduction, circular convection of the working fluid, or heat-radiation. To regain the advantage of thermal isolation of the two liquid tanks, a Brayton engine system may be modified to use a motile solid thermal storage medium, preferably pelletized. The solid thermal storage medium may take many forms, including but not limited to, ceramics, metal, rock, and refractory materials. Preferably, the solid medium is structurally stable at high temperature, of uniform shape and/or size, and shaped such that a bolus of solid medium naturally includes gaps between individual pellets. With the bolus of solid medium, direct contact heat exchangers may be used to simplify the system. Preferably, the direct contact heat exchangers may be arranged as counterflow heat exchangers for higher thermal efficiency.

With pelletized thermal storage medium, the hot side medium may reach temperatures over 1600 degrees Celsius and pressures over 100 bars in the heat exchanger. Similarly, cold side medium can go below −70 degrees Celsius and be below atmospheric pressure in a heat exchanger. Consequently, in a conventional Brayton engine system, this would require that motile solid thermal media also be stored at non-atmospheric pressure (i.e., a pressure vessel) prior to transfer into a heat exchanger; however, with the load-lock systems described herein, stored motile solid thermal media can be maintained at atmospheric pressure and still transferred at high or low temperatures.

II. Illustrative Reversible Heat Engine

Systems and devices in which example embodiments may be implemented will now be described in greater detail. However, an example system may also be implemented in or take the form of other devices, without departing from the scope of the invention.

An aspect of the disclosure relates to thermal systems operating on thermal storage cycles. In some examples, the cycles allow electricity to be stored as heat (e.g., in the form of a temperature differential) and then converted back to mechanical work and ultimately electricity through the use of at least two pieces of turbomachinery (a compressor and a turbine), and a generator. The compressor consumes work and raises the temperature and pressure of a working fluid (WF). The turbine produces work and lowers the temperature and pressure of the working fluid. In some examples, more than one compressor and more than one turbine is used. In some cases, the system can include multiple compressors. In some cases, the system can include multiple turbines. The compressors may be arranged in series or in parallel. The turbines may be arranged in series or in parallel.

Figure 2:
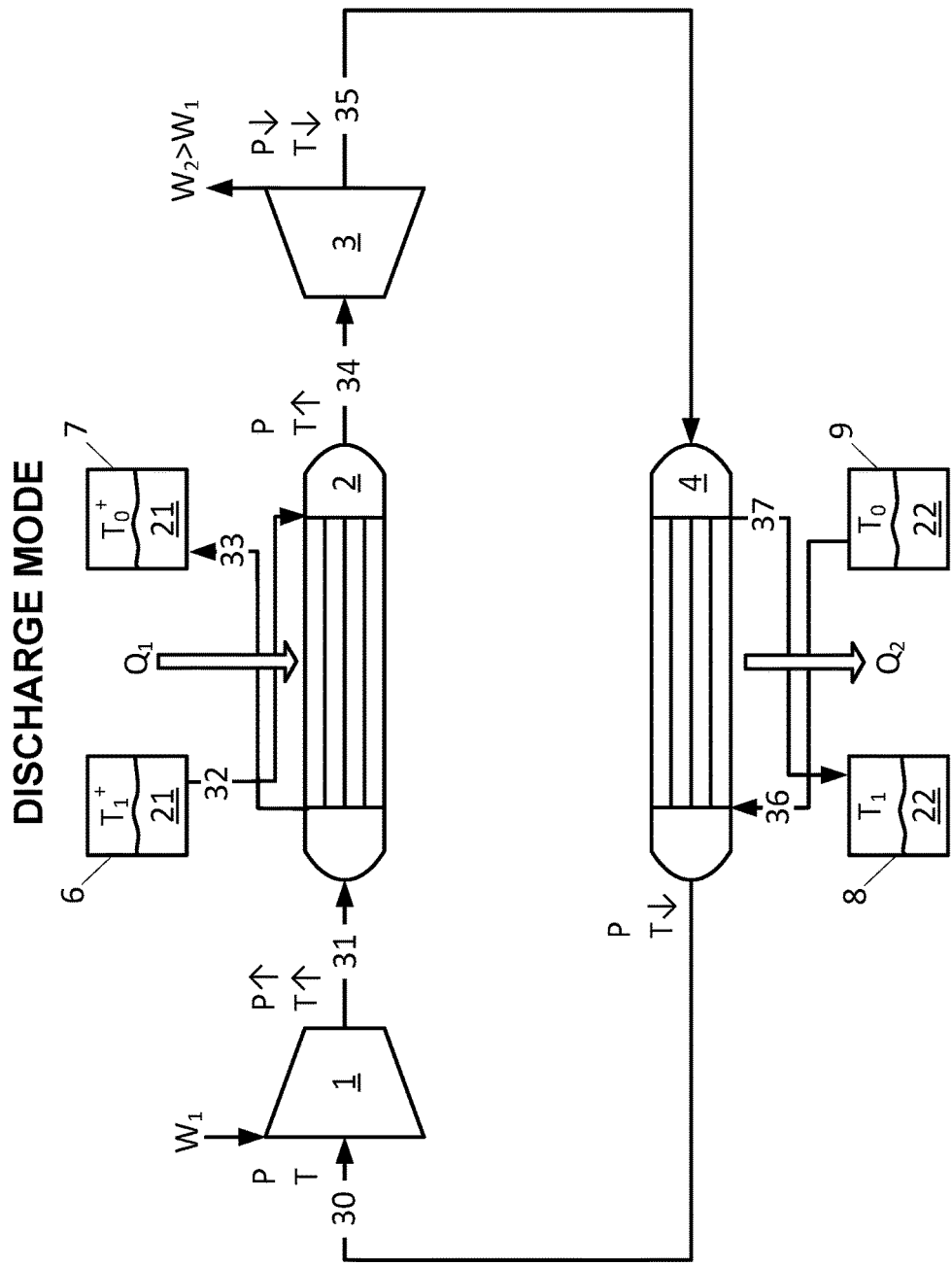
FIG. 2 is a schematic flow diagram of working fluid and heat storage media of a thermal system in a discharge/heat engine mode.

FIGS. 1 and 2 are schematic flow diagrams of working fluid and heat storage medium of an example thermal system in a charge/heat pump mode and in a discharge/heat engine mode, respectively. The system may be idealized for simplicity of explanation so that there are no losses (i.e., entropy generation) in either the turbomachinery or heat exchangers. The system can include a working fluid (e.g., argon gas) flowing in a closed cycle between a compressor 1, a hot side heat exchanger 2, a turbine 3 and a cold side heat exchanger 4. Fluid flow paths/directions for the working fluid (e.g., a gas), a hot side thermal storage (HTS) medium 21 (e.g., a low viscosity liquid or a solid medium) and a cold side thermal storage (CTS) medium 22 (e.g., a low viscosity liquid or a solid medium) are indicated by arrows. The heat exchangers 2 and 4 exchangers may incorporate, for example, conventional liquid-to-gas exchange for liquid thermal storage media (e.g., tube-and-shell exchangers or plate exchanger) and solid-to-gas exchange (e.g., direct contact) for solid thermal medium and may require pumping and/or conveyance mechanisms for the media.

Figure 3A:
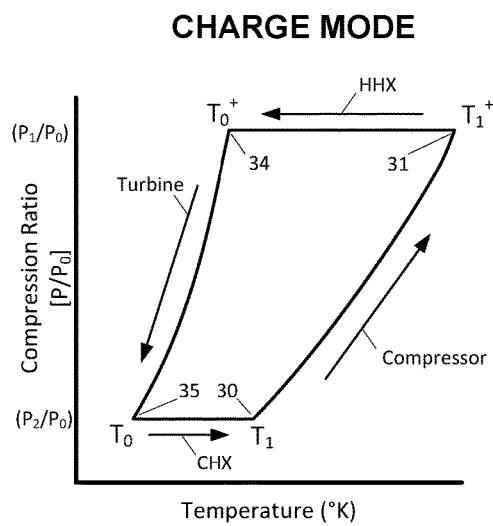
FIG. 3A is a schematic pressure and temperature diagram of the working fluid as it undergoes the charge cycle in FIG. 1.
Figure 3B:
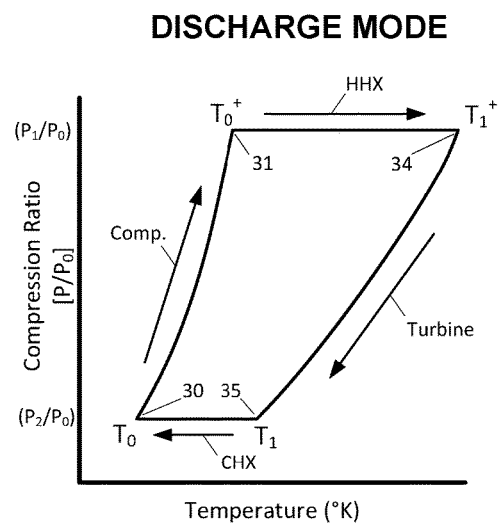
FIG. 3B is a schematic pressure and temperature diagram of the working fluid as it undergoes the discharge cycle in FIG. 2.

FIGS. 3A and 3B are schematic pressure and temperature diagrams of the working fluid as it undergoes the charge cycles in FIGS. 1 and 2, respectively, once again simplified in the approximation of no entropy generation. Normalized pressure is shown on the y-axes and temperature is shown on the x-axes. The direction of processes taking place during the cycles is indicated with arrows, and the individual processes taking place in the compressor 1, the hot side CFX 2, the turbine 3 and the cold side CFX 4 are indicated on the diagram with their respective circled numerals.

The heat exchangers 2 and 4 can be configured as counter-flow heat exchangers (CFXs), where the working fluid flows in one direction and the substance it is exchanging heat with is flowing or moving or has a temperature gradient in the opposite direction. In an ideal counter-flow heat exchanger with correctly matched flows (i.e., balanced capacities or capacity flow rates or thermocline gradient), the temperatures of the working fluid and thermal storage medium flip (i.e., the counter-flow heat exchanger can have unity effectiveness).

The counter-flow heat exchangers 2 and 4 can be designed and/or operated to reduce entropy generation in the heat exchangers to negligible levels compared to entropy generation associated with other system components and/or processes (e.g., compressor and/or turbine entropy generation). In some cases, the system may be operated such that entropy generation in the system is minimized. For example, the system may be operated such that entropy generation associated with heat storage units is minimized. In some cases, a temperature difference between fluid or solid elements exchanging heat can be controlled during operation such that entropy generation in hot side and cold side heat storage units is minimized. In some instances, the entropy generated in the hot side and cold side heat storage units is negligible when compared to the entropy generated by the compressor, the turbine, or both the compressor and the turbine. In some instances, entropy generation associated with heat transfer in the heat exchangers 2 and 4 and/or entropy generation associated with operation of the hot side storage unit, the cold side storage unit or both the hot side and cold side storage units can be less than about 50%, less than about 25%, less than about 20%, less than about 15%, less than about 10%, less than about 5%, less than about 4%, less than about 3%, less than about 2%, or less than about 1% of the total entropy generated within the system (e.g., entropy generated by the compressor 1, the hot side heat exchanger 2, the turbine 3, the cold side heat exchanger 4 and/or other components described herein, such as, for example, a recuperator). For example, entropy generation can be reduced or minimized if the two substances exchanging heat do so at a local temperature differential $\Delta T \rightarrow 0$ (i.e., when the temperature difference between any two fluid or solid media elements that are in close thermal contact in the heat exchanger is small). In some examples, the temperature differential $\Delta T$ between any two fluid or solid media elements that are in close thermal contact may be less than about 300 Kelvin (K), less than about 200 K, less than about 100 K, less than about 75 K, less than about 50 K, less than about 40 K, less than about 30 K, less than about 20 K, less than about 10 K, less than about 5 K, less than about 3 K, less than about 2 K, or less than about 1 K. In another example, entropy generation associated with pressure drop can be reduced or minimized by suitable design. In some examples, the heat exchange process can take place at a constant or near-constant pressure. Alternatively, a non-negligible pressure drop may be experienced by the working fluid and/or one or more thermal storage media during passage through a heat exchanger. Pressure drop in heat exchangers may be controlled (e.g., reduced or minimized) through suitable heat exchanger design. In some examples, the pressure drop across each heat exchanger may be less than about 20% of inlet pressure, less than about 10% of inlet pressure, less than about 5% of inlet pressure, less than about 3% of inlet pressure, less than about 2% of inlet pressure, less than about 1% of inlet pressure, less than about 0.5% of inlet pressure, less than about 0.25% of inlet pressure, or less than about 0.1% of inlet pressure.

Upon entering the heat exchanger 2, the temperature of the working fluid can either increase (taking heat from the HTS medium 21, corresponding to the discharge mode in FIGS. 2 and 3B) or decrease (giving heat to the HTS medium 21, corresponding to the charge mode in FIGS. 1 and 3A), depending on the temperature of the HTS medium in the heat exchanger relative to the temperature of the working fluid. Similarly, upon entering the heat exchanger 4, the temperature of the working fluid can either increase (taking heat from the CTS medium 22, corresponding to the charge mode in FIGS. 1 and 3A) or decrease (giving heat to the CTS medium 22, corresponding to the discharge mode in FIGS. 2 and 3B), depending on the temperature of the CTS medium in the heat exchanger relative to the temperature of the working fluid.

As described in more detail with reference to the charge mode in FIGS. 1 and 3A, the heat addition process in the cold side CFX 4 can take place over a different range of temperatures than the heat removal process in the hot side CFX 2. Similarly, in the discharge mode in FIGS. 2 and 3B, the heat rejection process in the cold side CFX 4 can take place over a different range of temperatures than the heat addition process in the hot side CFX 2. At least a portion of the temperature ranges of the hot side and cold side heat exchange processes may overlap during charge, during discharge, or during both charge and discharge.

As used herein, the temperatures $T_0$, $T_1$, $T_0^+$ and $T_1^+$ are so named because $T_0^-$, $T_1^+$ are the temperatures achieved at the exit of a compressor with a given compression ratio r, adiabatic efficiency $\eta_c$ and inlet temperatures of $T_0$, $T_1$ respectively. The examples in FIGS. 1, 2, 3A and 3B can be idealized examples where $\eta_c=1$ and where adiabatic efficiency of the turbine $\eta_t$ also has the value $\eta_t=1$.

With reference to the charge mode shown in FIGS. 1 and 3A, the working fluid can enter the compressor 1 at position 30 at a pressure P and a temperature T (e.g., at $T_1$, $P_2$). As the working fluid passes through the compressor, work $W_1$ is consumed by the compressor to increase the pressure and temperature of the working fluid (e.g., to $T_1^+$, $P_1$), as indicated by P↑ and T↑ at position 31. In the charge mode, the temperature $T_1^+$ of the working fluid exiting the compressor and entering the hot side CFX 2 at position 31 is higher than the temperature of the HTS medium 21 entering the hot side CFX 2 at position 32 from a second hot side thermal storage tank 7 at a temperature $T_0^+$ (i.e., $T_0^+<T_1^+$). As these working fluid and thermal medium pass in thermal contact with each other in the heat exchanger, the working fluid's temperature decreases as it moves from position 31 to position 34, giving off heat $Q_1$ to the HTS medium, while the temperature of the HTS medium in turn increases as it moves from position 32 to position 33, absorbing heat Q1 from the working fluid. In an example, the working fluid exits the hot side CFX 2 at position 34 at the temperature $T_0^+$ and the HTS medium exits the hot side CFX 2 at position 33 into a first hot side thermal storage tank 6 at the temperature $T_1^+$. The heat exchange process can take place at a constant or near-constant pressure such that the working fluid exits the hot side CFX 2 at position 34 at a lower temperature but same pressure P1, as indicated by P and T↓ at position 34. Similarly, the temperature of the HTS medium 21 increases in the hot side CFX 2, while its pressure can remain constant or near-constant.

Upon exiting the hot side CFX 2 at position 34 (e.g., at $T_0^+$, $P_1$), the working fluid undergoes expansion in the turbine 3 before exiting the turbine at position 35. During the expansion, the pressure and temperature of the working fluid decrease (e.g., to $T_0$, $P_2$), as indicated by P↓ and T↑ at position 35. The magnitude of work $W_2$ generated by the turbine depends on the enthalpy of the working fluid entering the turbine and the degree of expansion. In the charge mode, heat is removed from the working fluid between positions 31 and 34 (in the hot side CFX 2) and the working fluid is expanded back to the pressure at which it initially entered the compressor at position 30 (e.g., $P_2$). The compression ratio (e.g., $P_1/P_2$) in the compressor 1 being equal to the expansion ratio in the turbine 3, and the enthalpy of the gas entering the turbine being lower than the enthalpy of the gas exiting the compressor, the work $W_2$ generated by the turbine 3 is smaller than the work $W_1$ consumed by the compressor 1 (i.e., $W_2 < W_1$).

Because heat was taken out of the working fluid in the hot side CFX 2, the temperature $T_0$ at which the working fluid exits the turbine at position 35 is lower than the temperature $T_1$ at which the working fluid initially entered the compressor at position 30. To close the cycle (i.e., to return the pressure and temperature of the working fluid to their initial values $T_1$, $P_2$ at position 30), heat $Q_2$ is added to the working fluid from the CTS medium 22 in the cold side CFX 4 between positions 35 and 30 (i.e., between the turbine 3 and the compressor 1). In an example, the CTS medium 22 enters the cold side CFX 4 at position 36 from a first cold side thermal storage tank 8 at the temperature $T_1$ and exits the cold side CFX 4 at position 37 into a second cold side thermal storage tank 9 at the temperature $T_0$, while the working fluid enters the cold side CFX 4 at position 35 at the temperature $T_0$ and exits the cold side CFX 4 at position 30 at the temperature $T_1$. Again, the heat exchange process can take place at a constant or near-constant pressure such that the working fluid exits the cold side CFX 2 at position 30 at a higher temperature but same pressure $P_2$, as indicated by P and T↑ at position 30. Similarly, the temperature of the CTS medium 22 decreases in the cold side CFX 2, while its pressure can remain constant or near-constant.

During charge, the heat $Q_2$ is removed from the CTS medium and the heat $Q_1$ is added to the HTS medium, wherein $Q_1 > Q_2$. A net amount of work $(W_1 - W_2)$ is consumed, since the work $W_1$ used by the compressor is greater than the work $W_2$ generated by the turbine. A device that consumes work while moving heat from a cold body or thermal storage medium to a hot body or thermal storage medium is a heat pump; thus, the thermal system in the charge mode operates as a heat pump.

In an example, the discharge mode shown in FIGS. 2 and 3B can differ from the charge mode shown in FIGS. 1 and 3A in the temperatures of the thermal storage media being introduced into the heat exchangers. The temperature at which the HTS medium enters the hot side CFX 2 at position 32 is $T_1^+$ instead of $T_0^+$, and the temperature of the CTS medium entering the cold side CFX 4 at position 36 is $T_0$ instead of $T_1$. During discharge, the working fluid enters the compressor at position 30 at $T_0$ and $P_2$, exits the compressor at position 31 at $T_0^+ < T_1^-$ and $P_1$, absorbs heat from the HTS medium in the hot side CFX 2, enters the turbine 3 at position 34 at $T_1^+$ and P1, exits the turbine at position 35 at $T_1 > T_0$ and $P_2$, and finally rejects heat to the CTS medium in the cold side CFX 4, returning to its initial state at position 30 at $T_0$ and $P_2$.

The HTS medium at temperature $T_1^+$ can be stored in a first hot side thermal storage tank 6, the HTS medium at temperature $T_0^+$ can be stored in a second hot side thermal storage tank 7, the CTS medium at temperature $T_1$ can be stored in a first cold side thermal storage tank 8, and the CTS medium at temperature $T_0$ can be stored in a second cold side thermal storage tank 9 during both charge and discharge modes. In one implementation, the inlet temperature of the HTS medium at position 32 can be switched between $T_1^+$ and $T_0^+$ by switching between tanks 6 and 7, respectively. Similarly, the inlet temperature of the CTS medium at position 36 can be switched between $T_1$ and $T_0$ by switching between tanks 8 and 9, respectively. Switching between tanks can be achieved by including a valve or a system of valves, or a conveyance system or a group of conveyance systems, for switching connections between the hot side heat exchanger 2 and the hot side tanks 6 and 7, and/or between the cold side heat exchanger 4 and the cold side tanks 8 and 9 as needed for the charge and discharge modes. In some implementations, connections may be switched on the working fluid side instead, while the connections of storage tanks 6, 7, 8 and 9 to the heat exchangers 2 and 4 remain static. In some examples, flow paths and connections to the heat exchangers may depend on the design (e.g., shell-and-tube or direct-contact) of each heat exchanger. In some implementations, one or more valves or conveyance systems can be used to switch the direction of both the working fluid and the heat storage media through the counter-flow heat exchanger on charge and discharge. Such configurations may be used, for example, due to high thermal storage capacities of the heat exchanger component, to decrease or eliminate temperature transients, or a combination thereof. In some implementations, one or more valves or conveyance systems can be used to switch the direction of only the working fluid, while the direction of the HTS or CTS can be changed by changing the direction of pumping or conveyance, thereby maintaining the counter-flow configuration. In some implementations, different valve configurations or conveyance systems may be used for the HTS and the CTS. Further, any combination of the valve or conveyance configurations herein may be used. For example, the system may be configured to operate using different valve or conveyance configurations in different situations (e.g., depending on system operating conditions).

In the discharge mode shown in FIGS. 2 and 3B, the working fluid can enter the compressor 1 at position 30 at a pressure P and a temperature T (e.g., at $T_0$, $P_2$). As the working fluid passes through the compressor, work $W_1$ is consumed by the compressor to increase the pressure and temperature of the working fluid (e.g., to $T_0^+$, $P_1$), as indicated by P↑ and T↑ at position 31. In the discharge mode, the temperature $T_0+$ of the working fluid exiting the compressor and entering the hot side CFX 2 at position 31 is lower than the temperature of the HTS medium 21 entering the hot side CFX 2 at position 32 from a first hot side thermal storage tank 6 at a temperature $T_1^+$ (i.e., $T_0^+ < T_1^-$). As these two fluids pass in thermal contact with each other in the heat exchanger, the working fluid's temperature increases as it moves from position 31 position 34, absorbing heat $Q_1$ from the HTS medium, while the temperature of the HTS medium in turn decreases as it moves from position 32 to position 33, giving off heat $Q_1$ to the working fluid. In an example, the working fluid exits the hot side CFX 2 at position 34 at the temperature $T_1^+$ and the HTS medium exits the hot side CFX 2 at position 33 into the second hot side thermal storage tank 7 at the temperature $T_0^+$. The heat exchange process can take place at a constant or near-constant pressure such that the working fluid exits the hot side CFX 2 at position 34 at a higher temperature but same pressure $P_1$, as indicated by P and T↑ at position 34. Similarly, the temperature of the HTS medium 21 decreases in the hot side CFX 2, while its pressure can remain constant or near-constant.

Upon exiting the hot side CFX 2 at position 34 (e.g., at $T_1^+$, $P_1$), the working fluid undergoes expansion in the turbine 3 before exiting the turbine at position 35. During the expansion, the pressure and temperature of the working fluid decrease (e.g., to $T_1$, $P_2$), as indicated by P↓ and T↓ at position 35. The magnitude of work $W_2$ generated by the turbine depends on the enthalpy of the working fluid entering the turbine and the degree of expansion. In the discharge mode, heat is added to the working fluid between positions 31 and 34 (in the hot side CFX 2) and the working fluid is expanded back to the pressure at which it initially entered the compressor at position 30 (e.g., P2). The compression ratio (e.g., $P_1/P_2$) in the compressor 1 being equal to the expansion ratio in the turbine 3, and the enthalpy of the gas entering the turbine being higher than the enthalpy of the gas exiting the compressor, the work $W_2$ generated by the turbine 3 is greater than the work $W_1$ consumed by the compressor 1 (i.e., $W_2 > W_1$).

Because heat was added to the working fluid in the hot side CFX 2, the temperature $T_1$ at which the working fluid exits the turbine at position 35 is higher than the temperature $T_0$ at which the working fluid initially entered the compressor at position 30. To close the cycle (i.e., to return the pressure and temperature of the working fluid to their initial values $T_0$, $P_2$ at position 30), heat $Q_2$ is rejected by the working fluid to the CTS medium 22 in the cold side CFX 4 between positions 35 and 30 (i.e., between the turbine 3 and the compressor 1). The CTS medium 22 enters the cold side CFX 4 at position 36 from a second cold side thermal storage tank 9 at the temperature $T_0$ and exits the cold side CFX 4 at position 37 into a first cold side thermal storage tank 8 at the temperature $T_1$, while the working fluid enters the cold side CFX 4 at position 35 at the temperature $T_1$ and exits the cold side CFX 4 at position 30 at the temperature $T_0$. Again, the heat exchange process can take place at a constant or near-constant pressure such that the working fluid exits the cold side CFX 2 at position 30 at a higher temperature but same pressure $P_2$, as indicated by P and T↓ at position 30. Similarly, the temperature of the CTS medium 22 increases in the cold side CFX 2, while its pressure can remain constant or near-constant.

During discharge, the heat $Q_2$ is added to the CTS medium and the heat $Q_1$ is removed from the HTS medium, wherein $Q_1 > Q_2$. A net amount of work $(W_2 - W_1)$ is generated, since the work $W_1$ used by the compressor is smaller than the work $W_2$ generated by the turbine. A device that generates work while moving heat from a hot body or thermal storage medium to a cold body or thermal storage medium is a heat engine; thus, the thermal system in the discharge mode operates as a heat engine.

Another aspect of the disclosure is directed to thermal systems with regeneration/recuperation. In some situations, the terms regeneration and recuperation can be used interchangeably, although they may have different meanings. As used herein, the terms "recuperation" and "recuperator" generally refer to the presence of one or more additional heat exchangers where the working fluid exchanges heat with itself during different segments of a thermodynamic cycle through continuous heat exchange without intermediate thermal storage. As used herein, the terms "regeneration" and "regenerator" may be used to describe the same configuration as the terms "recuperation" and "recuperator." The roundtrip efficiency of thermal systems may be substantially improved if the allowable temperature ranges of the storage materials can be extended. In some implementations, this may be accomplished by choosing a material or medium on the cold side that can go to temperatures below 273 K (0° C.). For example, a CTS medium (e.g., hexane) with a low temperature limit of approximately $T_0=179$ K (−94° C.) may be used in a system with a molten salt or solid HTS medium. However, $T_0^-$ (i.e., the lowest temperature of the working fluid in the hot side heat exchanger) at some (e.g., modest) compression ratios may be below the freezing point of the molten salt, making the molten salt unviable as the HTS medium. In some implementations, this can be resolved by including a working fluid to working fluid (e.g., gas-gas) heat exchanger (also "recuperator" or "regenerator" herein) in the cycle.

Figure 4:
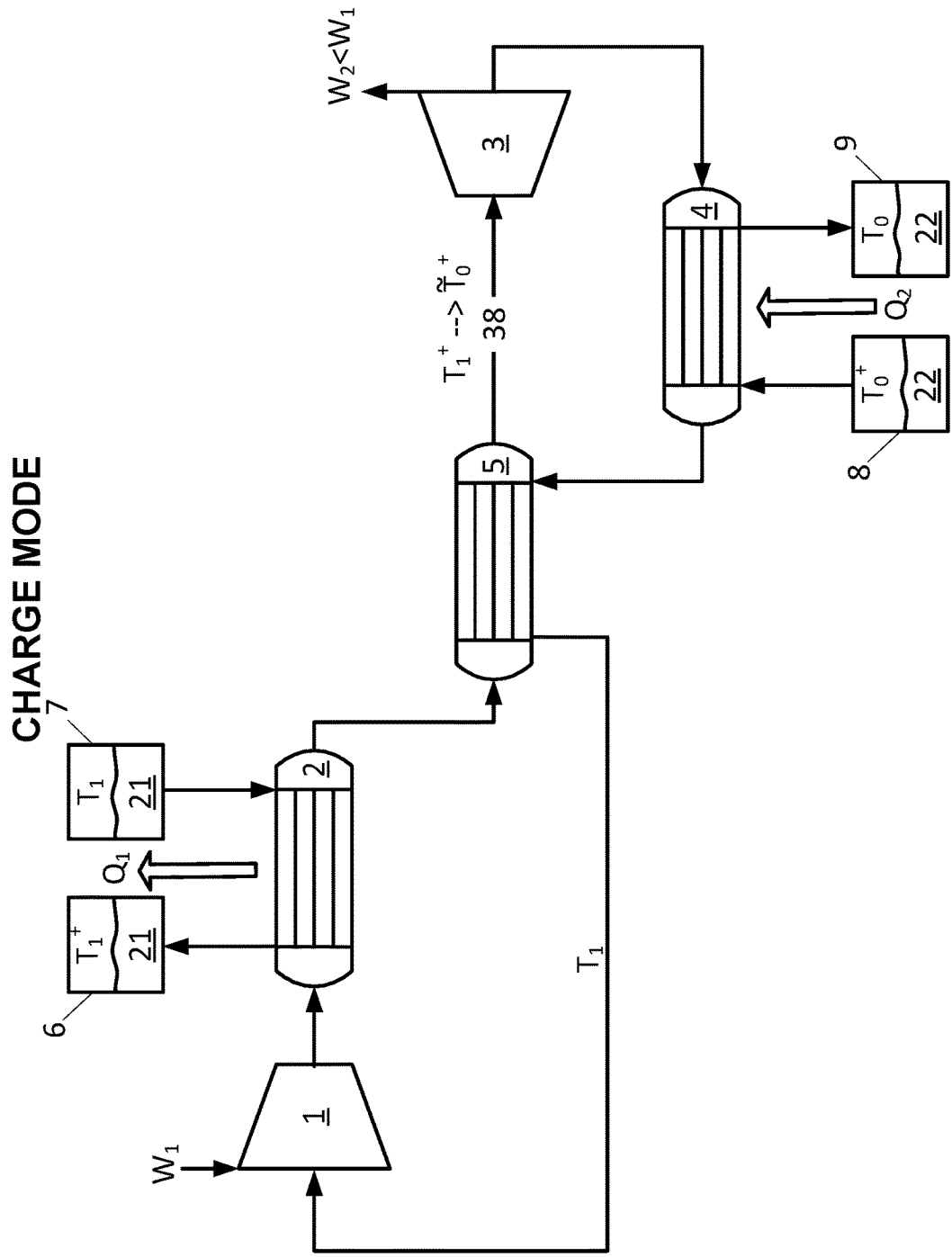
FIG. 4 is a schematic flow diagram of working fluid and heat storage media of a thermal system with a gas-gas heat exchanger for the working fluid in a charge/heat pump mode.

FIG. 4 is a schematic flow diagram of working fluid and heat storage media of a thermal system in a charge/heat pump mode with a gas-gas heat exchanger 5 for the working fluid. The use of the gas-gas heat exchanger can enable use of colder heat storage medium on the cold side of the system. As examples, the working fluid can be argon or a mixture of primarily argon mixed with another gas such as helium. For example, the working fluid may comprise at least about 50% argon, at least about 60% argon, at least about 70% argon, at least about 80% argon, at least about 90% argon, or about 100% argon, with balance helium.

Figures 6A, 6B:
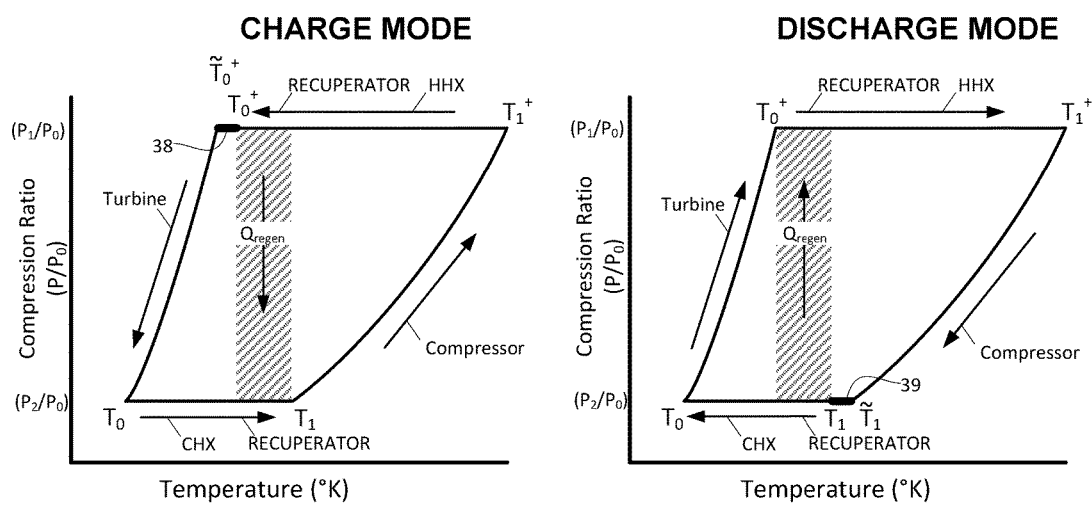
FIG. 6A is a schematic pressure and temperature diagram of the working fluid as it undergoes the charge cycle in FIG. 4.
FIG. 6B is a schematic pressure and temperature diagram of the working fluid as it undergoes the discharge cycle in FIG. 5.

FIG. 6A shows a heat storage charge cycle for the storage system in FIG. 4 with a cold side storage medium (e.g., liquid hexane or heptane) capable of going down to approximately to 179 K (−94° C.) and a molten salt or solid medium as the hot side storage, and $\eta_c=0.9$ and $\eta_t=0.95$. In some cases, the system can include more than four heat storage tanks.

In one implementation, during charge in FIGS. 4 and 6A, the working fluid enters the compressor at $T_1$ and $P_2$, exits the compressor at $T_1^+$ and $P_1$, rejects heat $Q_1$, to the HTS medium 21 in the hot side CFX 2, exiting the hot side CFX 2 at $T_1$ and $P_1$, rejects heat $Q_{recup}$ (also "$Q_{regen}$" herein, as shown, for example, in the accompanying drawings) to the cold (low pressure) side working fluid in the heat exchanger or recuperator 5, exits the recuperator 5 at $T_0^+$ and $P_1$, rejects heat to the environment (or other heat sink) in section 38 (e.g., a radiator), enters the turbine 3 at $\tilde{T}_0^+$ and $P_1$, exits the turbine at $T_0$ and $P_2$, absorbs heat $Q_2$ from the CTS medium 22 in the cold side CFX 4, exiting the cold side CFX 4 at $T_0^+$ and $P_2$, absorbs heat $Q_{recup}$ from the hot (high pressure) side working fluid in the heat exchanger or recuperator 5, and finally exits the recuperator 5 at $T_1$ and $P_2$, returning to its initial state before entering the compressor.

Figure 5:
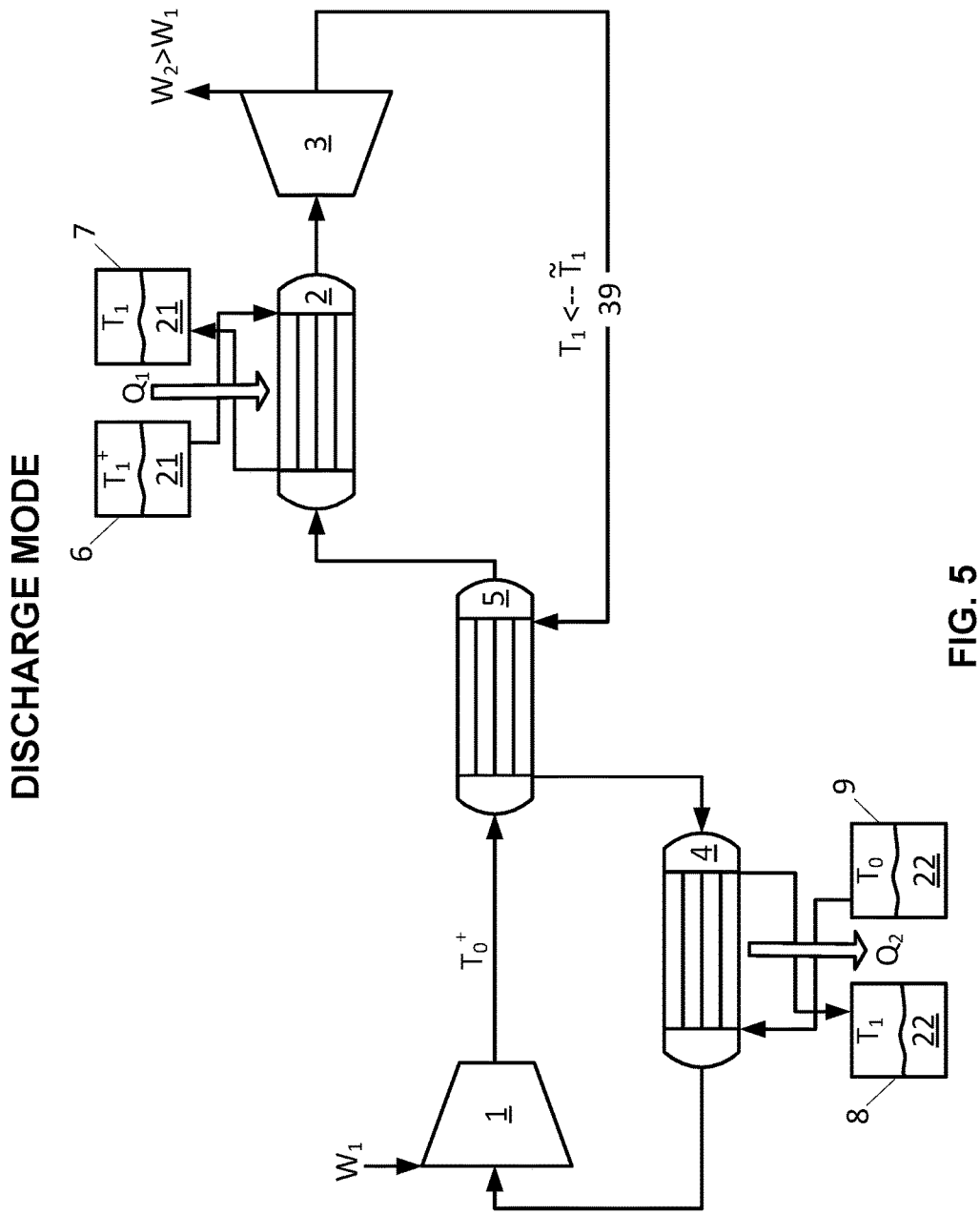
FIG. 5 is a schematic flow diagram of working fluid and heat storage media of a thermal system with a gas-gas heat exchanger for the working fluid in a discharge/heat engine mode.

FIG. 5 is a schematic flow diagram of working fluid and heat storage media of the thermal system in FIG. 4 in a discharge/heat engine mode. Again, the use of the gas-gas heat exchanger can enable use of colder heat storage fluid or solid medium (CTS) and/or colder working fluid on the cold side of the system.

FIG. 6B shows a heat storage discharge cycle for the storage system for the storage system in FIG. 5 with a cold side storage medium (e.g., liquid hexane) capable of going down to 179 K (−94° C.) and a molten salt or solid medium as the hot side storage, and $\eta_c=0.9$ and $\eta_t=0.95$.

During discharge in FIGS. 5 and 6B, the working fluid enters the compressor at $T_0$ and $P_2$, exits the compressor at $T_0^+$ and $P_1$, absorbs heat $Q_{recup}$ from the cold (low pressure) side working fluid in the heat exchanger or recuperator 5, exits the recuperator 5 at $T_1$ and $P_1$, absorbs heat $Q_1$ from the HTS medium 21 in the hot side CFX 2, exiting the hot side CFX 2 at $T_1^+$ and $P_1$, enters the turbine 3 at $\tilde{T}_1^+$ and $P_1$, exits the turbine at $\tilde{T}_1$ and $P_2$, rejects heat to the environment (or other heat sink) in section 39 (e.g., a radiator), rejects heat $Q_{recup}$ to the hot (high pressure) side working fluid in the heat exchanger or recuperator 5, enters the cold side CFX 4 at $T_0^+$ and $P_2$, rejects heat $Q_2$ to the CTS medium 22 in the cold side CFX 4, and finally exits the cold side CFX 4 at $T_0$ and $P_2$, returning to its initial state before entering the compressor.

In some examples, recuperation may enable the compression ratio to be reduced. In some cases, reducing the compression ratio may result in reduced compressor and turbine losses. In some cases, the compression ratio may be at least about 1.2, at least about 1.5, at least about 2, at least about 2.5, at least about 3, at least about 3.5, at least about 4, at least about 4.5, at least about 5, at least about 6, at least about 8, at least about 10, at least about 15, at least about 20, at least about 30, or more.

In some cases, $T_0$ may be at least about 30 K, at least about 50 K, at least about 80 K, at least about 100 K, at least about 120 K, at least about 140 K, at least about 160 K, at least about 180 K, at least about 200 K, at least about 220 K, at least about 240 K, at least about 260 K, or at least about 280 K. In some cases, $T_0^-$ may be at least about 220 K, at least about 240 K, at least about 260 K, at least about 280 K, at least about 300 K, at least about 320 K, at least about 340 K, at least about 360 K, at least about 380 K, at least about 400 K, or more. In some cases, the temperatures $T_0$ and $T_0^+$ can be constrained by the ability to reject excess heat to the environment at ambient temperature. In some cases. the temperatures $T_0$ and $T_0^+$ can be constrained by the operating temperatures of the CTS (e.g., a phase transition temperature). In some cases, the temperatures $T_0$ and $T_0^+$ can be constrained by the compression ratio being used. Any description of the temperatures $T_0$ and/or $T_0^+$ herein may apply to any system or method of the disclosure.

In some cases, $T_1$ may be at least about 350K, at least about 400 K, at least about 440 K, at least about 480 K, at least about 520 K, at least about 560 K, at least about 600 K, at least about 640 K, at least about 680 K, at least about 720 K, at least about 760 K, at least about 800 K, at least about 840 K, at least about 880 K, at least about 920 K, at least about 960 K, at least about 1000 K, at least about 1100 K, at least about 1200 K, at least about 1300 K, at least about 1400 K, or more. In some cases, $T_1^+$ may be at least about 480 K, at least about 520 K, at least about 560 K, at least about 600 K, at least about 640 K, at least about 680 K, at least about 720 K, at least about 760 K, at least about 800 K, at least about 840 K, at least about 880 K, at least about 920 K, at least about 960 K, at least about 1000 K, at least about 1100 K, at least about 1200 K, at least about 1300 K, at least about 1400 K, at least about 1500 K, at least about 1600 K, at least about 1700 K, or more. In some cases. the temperatures $T_1$ and $T_1^+$ can be constrained by the operating temperatures of the HTS. In some cases. the temperatures $T_1$ and $T_1^+$ can be constrained by the thermal limits of the metals and materials being used in the system. For example, a conventional solar salt can have a recommended temperature range of approximately 560-840 K. Various system improvements, such as, for example, increased round-trip efficiency, increased power and increased storage capacity may be realized as available materials, metallurgy and storage materials improve over time and enable different temperature ranges to be achieved. Any description of the temperatures $T_1$ and/or $T_1^+$ herein may apply to any system or method of the disclosure.

In some cases, the round-trip efficiency $\eta_{store}$ (e.g., electricity storage efficiency) with and/or without recuperation can be at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some implementations, at least a portion of heat transfer in the system (e.g., heat transfer to and from the working fluid) during a charge and/or discharge cycle includes heat transfer with the environment (e.g., heat transfer in sections 38 and 39). The remainder of the heat transfer in the system can occur through thermal communication with thermal storage media (e.g., thermal storage media 21 and 22), through heat transfer in the recuperator 5 and/or through various heat transfer processes within system boundaries (i.e., not with the surrounding environment). In some examples, the environment may refer to gaseous or liquid reservoirs surrounding the system (e.g., air, water), any system or media capable of exchanging thermal energy with the system (e.g., another thermodynamic cycle or system, heating/cooling systems, etc.), or any combination thereof. In some examples, heat transferred through thermal communication with the heat storage media can be at least about 25%, at least about 50%, at least about 60%, at least about 70%, at least about 80%, or at least about 90% of all heat transferred in the system. In some examples, heat transferred through heat transfer in the recuperator can be at least about 5%, at least about 10%, at least about 15%, at least about 20%, at least about 25%, at least about 50%, or at least about 75% of all heat transferred in the system. In some examples, heat transferred through thermal communication with the heat storage media and through heat transfer in the recuperator can be at least about 25%, at least about 50%, at least about 60%, at least about 70%, at least about 80%, at least about 90%, or even about 100% of all heat transferred in the system. In some examples, heat transferred through heat transfer with the environment can be less than about 5%, less than about 10%, less than about 15%, less than about 20%, less than about 30%, less than about 40%, less than about 50%, less than about 60%, less than about 70%, less than about 80%, less than about 90%, less than about 100%, or even 100% of all heat transferred in the system. In some implementations, all heat transfer in the system may be with the thermal storage media (e.g., the CTS and HTS media), and only the thermal storage media may conduct heat transfer with the environment.

Thermal cycles of the disclosure (e.g., the cycles in FIGS. 4 and 5) may be implemented through various configurations of pipes and valves for transporting the working fluid between the turbomachinery and the heat exchangers. In some implementations, a valving system may be used such that the different cycles of the system can be interchanged while maintaining the same or nearly the same temperature profile across at least one, across a subset or across all of counter-flow heat exchangers in the system. For example, the valving may be configured such that the working fluid can pass through the heat exchangers in opposite flow directions on charge and discharge and flow or conveyance directions of the HTS and CTS media are reversed by reversing the direction of the pumps or conveyance systems.

In some implementations, the system may be set up to enable switching between different cycles. Such a configuration may be advantageous as it may reuse at least a portion, or a substantial portion, or a majority, of the same piping and/or connections for the working fluid in both the charging and discharging modes. While the working fluid may change direction between charge and discharge, the temperature profile of the heat exchangers can be kept constant, partially constant, or substantially or fully constant, by changing the direction in which the HTS medium and the CTS medium are pumped or conveyed when switching from charge to discharge and vice-versa, and/or by matching the heat fluxes of the working fluid, the HTS medium and the CTS medium appropriately.

III. Illustrative Load-Locks

Figure 7:
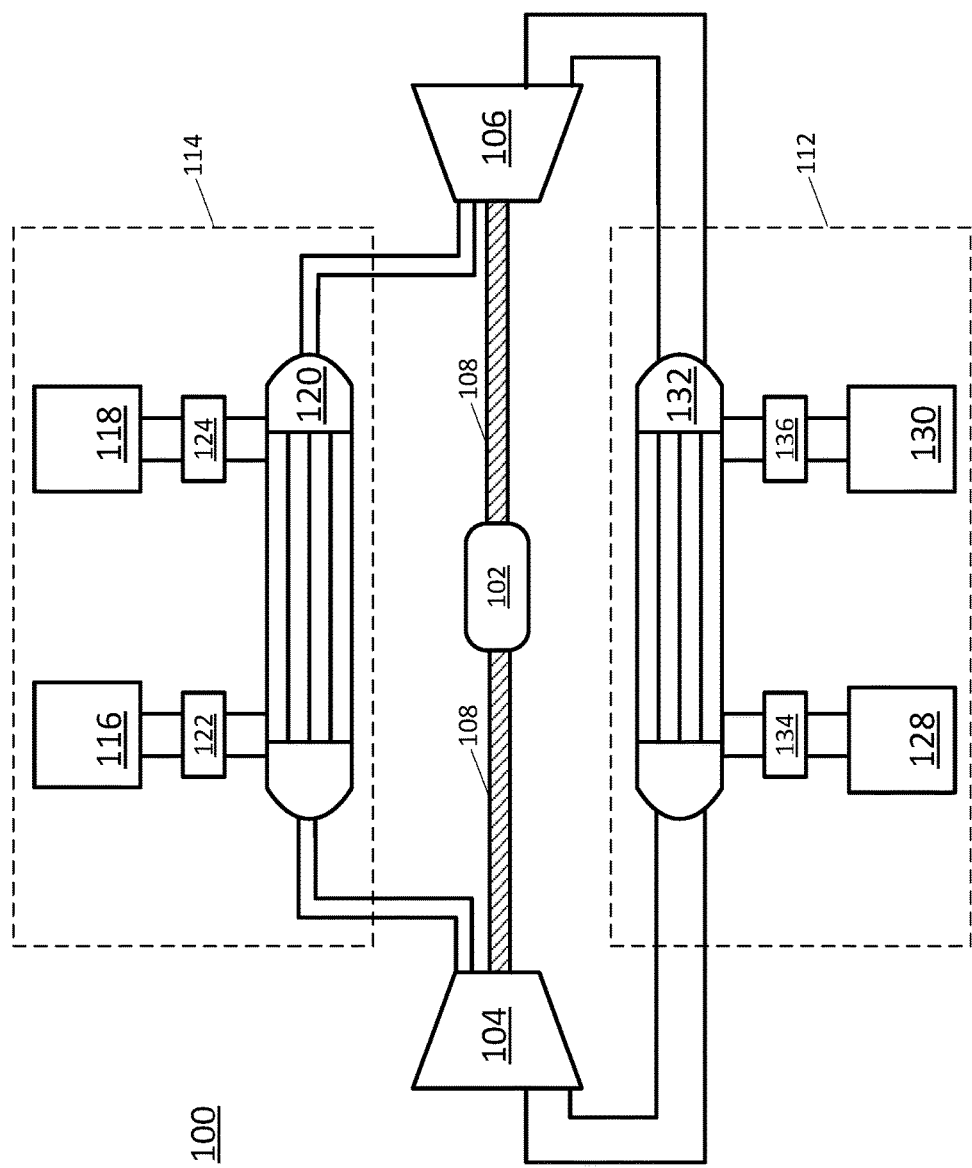
FIG. 7 illustrates a heat engine with load-locks according to an example embodiment.

FIG. 7 illustrates a heat engine 100. The heat engine 100 may be reversible (i.e., operate as a heat pump) and may take the form of other heat engines and/or reversible heat engines describe herein and may include additional components than those shown in the illustration, including but not limited to one or more recuperators or regenerators. The heat engine 100 may include a generator/motor 102 that may generate electricity or use electricity to operate a compressor 104. The generator/motor 102 may be mechanically coupled to the compressor 104 and a turbine 106. The compressor 104 and the turbine 106 may be coupled to the generator/motor 102 via one or more shafts 108. The heat engine 100 may use mechanical work to store heat and/or may provide mechanical work from stored heat. The heat engine 100 may have a hot side 114 and a cold side 112.

In one embodiment, the heat engine 100 may include a high-pressure heat exchanger 120 coupled between the compressor 104 and the turbine 106 on the hot side 110, where a working fluid contacts a thermal storage medium at greater than atmospheric pressure. The high-pressure heat exchanger 120 may be a direct contact heat exchanger ("DCHE") 120. A first hot storage container ("HSC") 118 may be coupled to the high-pressure heat exchanger 120 via a first load-lock 124 and may be configured to store thermal storage medium at or near atmospheric pressure. A first cold storage container ("CSC") 116 may be coupled to the high pressure heat exchanger 120 via a second load-lock 122 and may be configured to store thermal storage medium at or near atmospheric pressure.

As used herein, the terms hot storage and cold storage are used to reflect relative temperatures between storage containers that may share common thermal storage medium and do not necessarily refer to locations within a hot side 114 or a cold side 112 of a heat engine or heat pump. Similarly, the terms hot thermal medium and cold thermal medium are used to reflect relative temperatures between thermal medium in hot storage and cold storage and/or on opposing ends of a heat exchanger, as appropriate. Likewise, the terms hot working fluid and cold working fluid are used to reflect relative temperatures between working fluid streams or portions of a working fluid stream.

A low-pressure heat exchanger, which may be a second DCHE 132, may be coupled between the compressor 104 and the turbine 106 on the cold side 112 where the working fluid may contact the thermal storage medium at less than atmospheric pressure. A second HSC 130 may be coupled to the DCHE 132 via a third load-lock 136 and may be configured to store thermal storage medium at or near atmospheric pressure. A second CSC 128 may be coupled to the second DCHE 132 via a fourth load-lock 134 and may be configured to store thermal storage medium at or near atmospheric pressure.

In one embodiment, a working fluid of the heat engine 100 may be an inert gas, such as argon. The thermal storage medium may be made from materials that have good thermal properties, such as an ability to readily transfer heat. The thermal storage medium may also be formed in pelletized shapes that can be easily transferred between one of the storage containers and the thermal exchanger, such as steel balls.

As an illustrative example, the temperature difference between the thermal storage medium in the first HSC 118 and the first CSC 116 may be approximately 400 degrees Celsius. For example, the temperature of the thermal storage medium in the first HSC 118 may be approximately 600 degrees Celsius and the temperature of the thermal storage medium in the first CSC 116 may be approximately 200 degrees Celsius. As another example, the temperature differential between the thermal storage medium in the second HSC 130 and the second CSC 128 may be maintained at approximately 100 degrees Celsius. For example, the temperature of the thermal storage medium in the second HSC 130 may be approximately 30 degrees Celsius and the temperature of the thermal storage medium in the second CSC 128 may be approximately −70 degrees Celsius.

Load-locks 122, 124, 134, and 136 may all be present in the system, or only load-locks on the hot side 114 or only load-locks on the cold side 112 may be present. Or the system may contain only a single load-lock, or only one load-lock on each of the hot side 114 and the cold side 112. More than four load-locks may be present. For example, multiple load-locks may connect a storage container to a heat-exchanger and/or multiple load-locks may connect one or more storage containers to one or more heat-exchanger, or allow various conveyance paths between various storage containers and heat-exchangers.

Figure 8A:
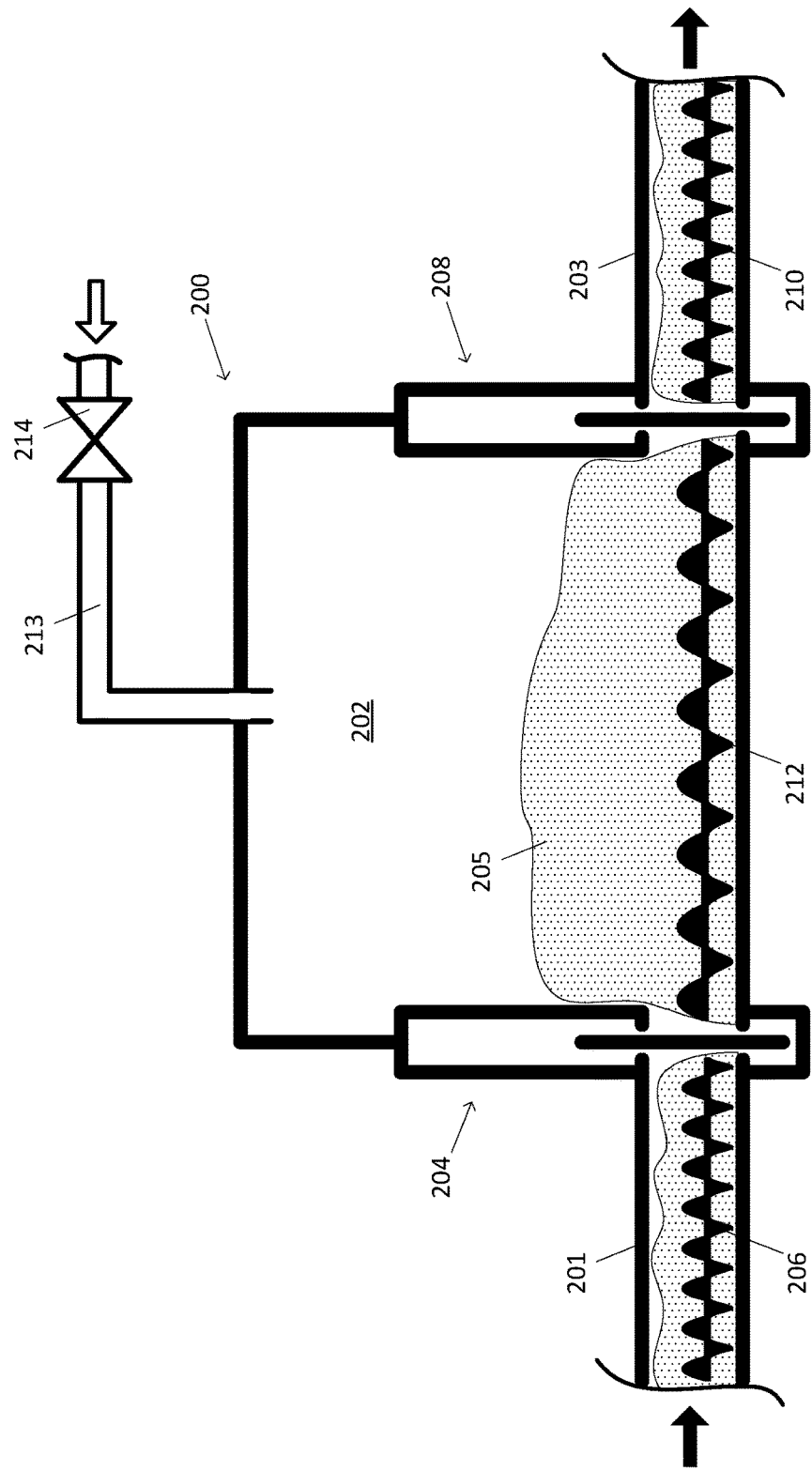
FIG. 8A illustrates a load-lock according to an example embodiment.

FIG. 8A illustrates an internal schematic view of an example load-lock 200. Load-lock 200 may function as any of load-locks 122, 124, 134, and/or 136. Load-lock 200 may contain all of the components illustrated in FIG. 8, or less than all of the components illustrated, and/or additional components not illustrated in FIG. 8. In one embodiment, the load-lock 200 may include a holding section 202 and a first pressure seal 204 that may be operable to seal the holding section 202 from a storage container the load-lock may be coupled to via connection 201. For example, load-lock 200 may be connected to HSC 118 via connection 201. Preferably, the holding section is a small or negligible volume compared to the volume of a connected storage container and/or heat exchanger. The load-lock 200 may include a second pressure seal 208 that may be operable to seal the holding section 202 from a heat exchanger the load-lock may be coupled to via connection 203, such as the first DCHE 120. The pressure seals 204 and 208 are depicted as gates, but may take any form capable of sealing and unsealing against pressure, and allowing fluid flow or solid medium conveyance when unsealed, including but not limited to, gate valves, knife valves, butterfly valves, and iris valves. Actuation means, such as solenoids and motors, to operate the pressure seals are generally known in the art and not depicted in the schematic illustration.

Pressure within the load-lock 200 and attached componentry, such as a storage container or a heat-exchanger may be preserved or changed based on operation of the pressure seals 204 and 208. For example, if a container at atmospheric pressure is coupled to a high-pressure heat exchanger via load-lock 200, pressure seal 208 may be closed and pressure seal 204 may be opened when thermal medium is loaded into the holding section 202 from the storage container. When loading is complete, pressure seal 204 may be closed and pressure seal 208 subsequently opened, thereby pressurizing holding section 202 and the thermal medium, but not the storage container. Reverse operation may also be possible to prevent escape of atmospheric pressure from a storage container to a low pressure (e.g., vacuum pressure) heat exchanger.

In another embodiment, load-lock 200 may include a third pressure seal 214, illustrated in FIG. 8 as a valve, that may connect to the holding section 202 via a gas fill pipe 213. The third pressure seal 214 may be used to regulate the pressure inside the holding section 202 by allowing gas to enter or leave the holding section 202, preferably when the first and second pressure seals 204 and 208 are closed. When the third pressure seal 214 is open, the gas fill pipe 213 (and holding section 202) may receive pressurized working fluid from a component coupled to the valve, such as another load-lock, a turbine, a compressor, a piston system, other working fluid storage vessel, or another component in the system. Alternatively, and depending on the load-lock's position and functions within the system, when the third pressure seal 214 is open, the gas fill pipe 213 (and holding section 202) may vent pressure to another component or the atmosphere.

In one embodiment, the load-lock 200 may include one or more feed mechanisms 206, 210, and/or 212 to transfer solid thermal storage medium in and out of the load-lock 200. Feed mechanisms 206, 210, and/or 212 are illustrated as augers, but may be any appropriate conveyance system, including but not limited to, conveyors, elevators, or vibratory beds. Each of the feed mechanisms 206, 210, and 212 may be reversible, such that they can convey solid thermal medium material into or out of the holding section 202. A first feed mechanism 206 may be disposed between the first pressure seal 204 on one end and a storage container, such as the first HSC 118, on the other end. The first feed mechanism 206 may transfer solid thermal storage medium between the storage container and the holding section 202. A second feed mechanism 210 may be disposed between the second pressure seal 208 on one end and a heat exchanger, such as the first DCHE 120, on the other end. The second feed mechanism 210 may transfer solid thermal storage medium between the holding section 202 and the heat exchanger. A third feed mechanism 212 may be located inside the holding section 202 and disposed between the first pressure seal 204 and the second pressure seal 208. The third feed mechanism 212 may transfer solid thermal storage medium inside the holding section 202 between the first pressure seal 204 and the second pressure seal 208. Actuation means, such as motors, to operate the feed mechanisms are generally known in the art and not depicted in the schematic illustration.

Alternative or additionally, thermal medium may be conveyed through the load-lock 200 by gravity. For example, a storage container could be elevated above load-lock 200, which in turn may be elevated above a heat exchanger. As pressure seals 204 and 208 are operated, gravity may cause the thermal medium to flow from the storage container to the holding section 202, and then from the holding section 202 to a heat exchanger. Feed mechanisms may also be incorporated to allow reverse operation in gravity feed systems and the system may be operated with thermal medium traveling in the opposite direction of gravity.

Figure 8B:
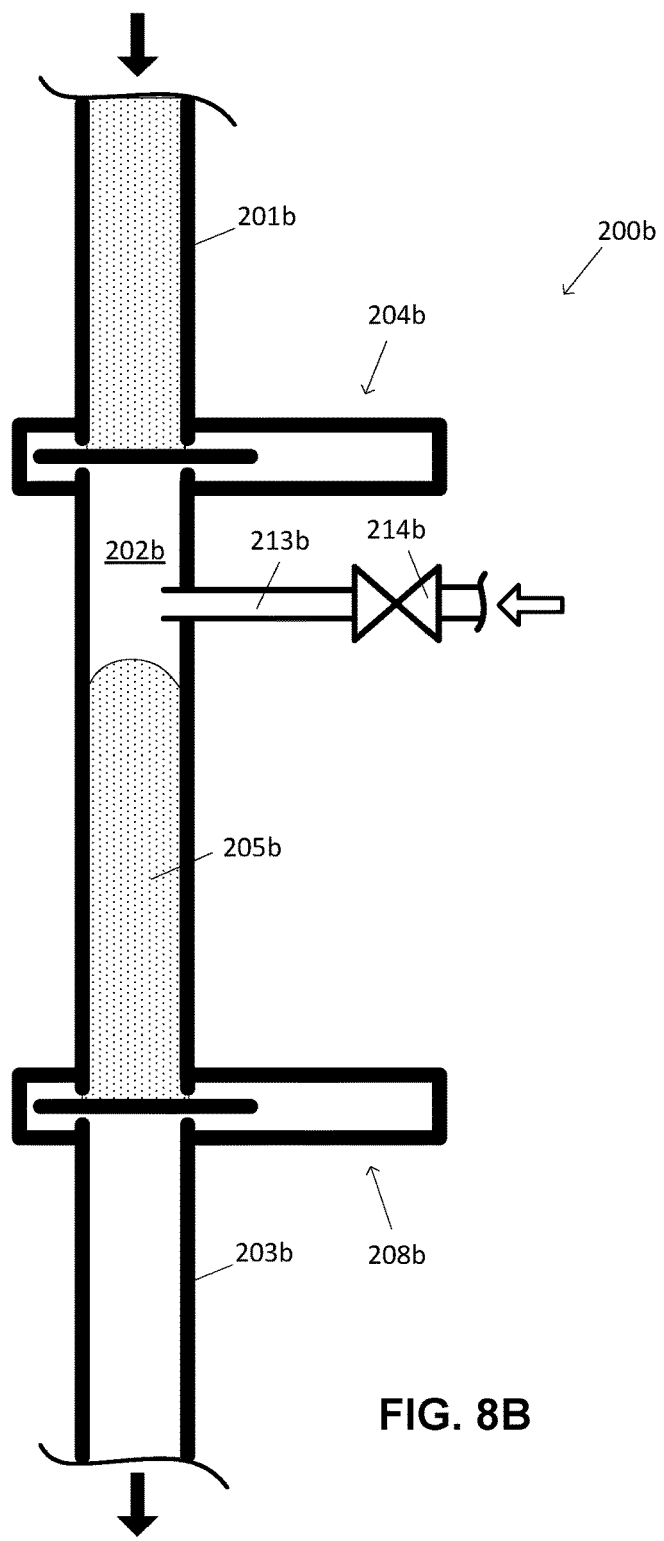
FIG. 8B illustrates a load-lock according to an example embodiment.

FIG. 8B illustrates an internal schematic view of an example load-lock 200b, which may function as a gravity feed load-lock. Load-lock 200 may function as any of load-locks 122, 124, 134, and/or 136. Load-lock 200 may contain all of the components illustrated in FIG. 8B, or less than all of the components illustrated, and/or additional components not illustrated in FIG. 8B. In one embodiment, the load-lock 200 may include a holding section 202b and a first pressure seal 204b that may be operable to seal the holding section 202b from a storage container the load-lock may be coupled to via connection 201b. For example, load-lock 200b may be connected to HSC 118 via connection 20b1. Preferably, the holding section is a small or negligible volume compared to the volume of a connected storage container and/or heat exchanger. The load-lock 200b may include a second pressure seal 208b that may be operable to seal the holding section 202b from a heat exchanger the load-lock may be coupled to via connection 203b, such as the first DCHE 120. The pressure seals 20b4 and 208b are depicted as gates, but may take any form capable of sealing and unsealing against pressure, and allowing fluid flow or solid medium conveyance when unsealed, including but not limited to, gate valves, knife valves, butterfly valves, and iris valves. Actuation means, such as solenoids and motors, to operate the pressure seals are generally known in the art and not depicted in the schematic illustration.

Pressure within the load-lock 200b and attached componentry, such as a storage container or a heat-exchanger may be preserved or changed based on operation of the pressure seals 204b and 208b. For example, if a container at atmospheric pressure is coupled to a high-pressure heat exchanger via load-lock 200b, pressure seal 20b8 may be closed and pressure seal 204b may be opened, allowing gravity-fed loading of thermal medium into the holding section 202b from the storage container, preferably at or near atmospheric pressure. When loading is complete, pressure seal 204b may be closed and pressure seal 208b subsequently opened, thereby pressurizing holding section 202 and gravity feeding the thermal medium into a connected heat exchanger.

In another embodiment, load-lock 200b may include a third pressure seal 214b, illustrated in FIG. 8B as a valve, that may connect to the holding section 202b via a gas fill pipe 213b. The third pressure seal 214b may be used to regulate the pressure inside the holding section 202b by allowing gas to enter or leave the holding section 202b, preferably when the first and second pressure seals 204b and 208b are closed. When the third pressure seal 214b is open, the gas fill pipe 213b (and holding section 202b) may receive pressurized working fluid from a component coupled to the valve, such as another load-lock, a turbine, a compressor, a piston system, other working fluid storage vessel, or another component in the system. Alternatively, and depending on the load-lock's position and functions within the system, when the third pressure seal 21b4 is open, the gas fill pipe 21b3 (and holding section 202b) may vent pressure to another component or the atmosphere.

Alternatively or additionally, thermal medium may be conveyed through the load-lock 200b by feed mechanisms. For example, a storage container could be elevated above load-lock 200b, which in turn may be elevated above a heat exchanger. As pressure seals 204b and 208b are operated, augers or other conveyance systems may cause the thermal medium to flow from the heat exchanger to the holding section 202b, and then from the holding section 202b to a storage container.

Figure 9:
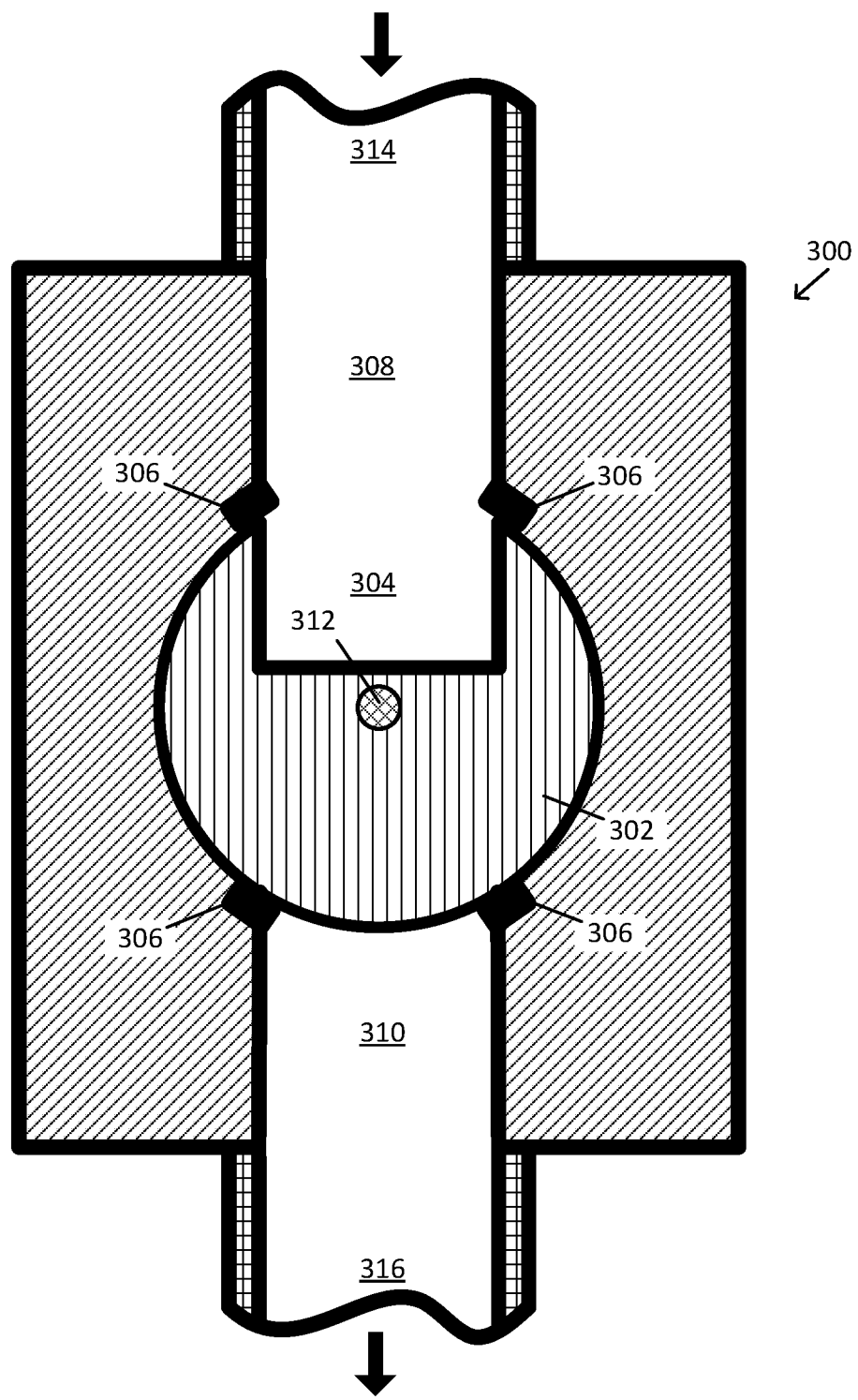
FIG. 9 illustrates a load-lock according to an example embodiment.

FIG. 9 illustrates a schematic view of an example rotary load-lock 300, in cross-section. Load-lock 300 may function as load-locks 122, 124, 134, and/or 136. Load-lock 300 may include a rotary bucket 302 rotating about a shaft 312, and the rotary bucket 302 may include one or more holding sections 304. Actuation means, such as solenoids and motors, to operate the rotary bucket 302 are generally known in the art and not depicted in the schematic illustration. Load-lock 300 may be coupled to a storage container, such as first HSC 118, on one side via connection 314, and to a heat exchanger, such as first DCHE 120, on the other side via connection 316. Preferably, the holding section is a small or negligible volume compared to the volume of a connected storage container and/or heat exchanger. Conveyance channels 308 and 310 may exist within the load-lock 300. Seals 306 may be present where where the bucket 302 meets the conveyance channels 308 and 310. The seals 306 may metallic, composite, or other materials suitable to maintain a pressure seal between channels 308 and 310 and bucket 302 through a range of temperatures, such as between −100 degrees Celsius and +100 degrees Celsius or between 200 degrees Celsius and 600 degrees Celsius. As in the gate-type seals illustrated in FIG. 8, the rotary-style load-lock 300 can move through various pressure seal conditions. By rotating the rotary bucket 302 such that the holding section 304 is open to channel 308 and, for example, a connected storage container, the rotary bucket 302 effectively closes a pressure seal at channel 310 to the heat exchanger. Next, by rotating the rotary bucket 302 such that the holding section 304 is closed to channel 308 and channel 310, the rotary bucket effectively closes pressure seals at channel 308 to the storage contained and at channel 310 to the heat exchanger. Finally, by rotating the rotary bucket 302 such that the holding section 304 is open to channel 310, the rotary bucket effectively closes a pressure seal at channel 308 to the storage container. Although not depicted, a gas fill or vent may be connected to load-lock 300, such that it couples to the holding section 304, for example, when the holding section is sealed between channels 308 and 310.

The holding section 304 may receive thermal storage medium, including solid thermal storage medium, from a storage container via the first channel 308. The thermal storage medium may be delivered to the holding section 304 by gravity in cases where the load-lock is oriented in a vertical position, or thermal storage medium may be delivered to the holding section 304 by one or more feed mechanisms such as an auger feeder or screw conveyer, as illustrated in FIG. 8. When the thermal storage medium is inside the bucket 302, the bucket 302 may rotate about shaft 312. When the bucket 302 reaches the channel 310 the bucket 304 may stop its rotation and discharge the thermal storage medium into the second channel 310 via gravity or another feed mechanism and subsequently into a heat exchanger, such as the first DCHE 120.

a. Example of Hot Side Transfer of Thermal Storage Media

In one embodiment, the load-lock 124, which may take the form of example load-locks 200 or 300 or forms that provide operable first and second seals between ends of the load-lock, may be connected to the first DCHE 120 and first HSC 118 as illustrated in FIG. 7. The load-lock 124 may receive a bolus of hot thermal storage medium from the first HSC 118 at atmospheric pressure with a first pressure seal open and a second pressure seal closed. After receiving the bolus, the first pressure seal may close and a holding section may retain the hot thermal storage medium with the first pressure seal closed and the second pressure seal closed. A third pressure seal may open and increase the pressure in the sealed holding section. The second pressure seal may open, which may increase the pressure in the holding section depending on whether the third pressure seal was opened, and if it was opened, how much pressure it allowed in. The hot thermal storage medium may then be dispatched to the first DCHE with the first pressure seal closed. The second pressure seal may then close and the load-lock 124 may repeat the cycle.

As another example, the load-lock 122 may be connected to the first DCHE 120 and first CSC 116. The load-lock 122 may be configured to receive a bolus cold thermal storage medium from the first DCHE 120 at greater than atmospheric pressure with the second pressure seal open and the first pressure seal closed. After receiving the bolus, the second pressure seal may close and a holding section may retain the cold thermal storage medium with the first pressure seal closed and the second pressure seal closed. A third pressure seal may open to decrease the pressure in the sealed holding section. The second pressure seal may open, which may decrease the pressure in the holding section depending on whether the third pressure seal was opened and if it was opened, how much pressure it vented. The hot thermal storage medium may then be dispatched to the first CSC with the second pressure seal closed. The first pressure seal may then close and the load-lock 122 may repeat the cycle.

b. Transfer of Thermal Storage Media on the Cold Side of the Thermal Engine

In one embodiment, the load-lock 134 may be connected to the second DCHE 132 and second CSC 128. The load-lock 134 may be configured to receive a bolus of cold thermal storage medium from the second CSC 128 at atmospheric pressure with the first pressure seal open and the second pressure seal closed. After receiving the bolus, the first pressure seal may close and a holding section may retain the cold thermal storage medium with the first pressure seal closed and the second pressure seal closed. A third pressure seal may open to decrease the pressure in the sealed holding section. The second pressure seal may open, which may decrease the pressure in the holding section depending on whether the third pressure seal was opened and if it was opened, how much pressure it vented. The cold thermal storage medium may then be dispatched to the second DCHE with the first pressure seal closed. The second pressure seal may then close and the load-lock 134 may repeat the cycle.

In another embodiment, the load-lock 136 may be connected to the second DCHE 132 and second HSC 130. The load-lock 136 may be configured to receive a bolus of hot thermal storage medium from the second DCHE 132 at less than atmospheric pressure with the second pressure seal open and the first pressure seal closed. After receiving the bolus, the second pressure seal may close and a holding section may retain the hot thermal storage medium with the first pressure seal closed and the second pressure seal closed. A third pressure seal may open to increase the pressure in the sealed holding section. The first pressure seal may open, which may increase the pressure in the holding section depending on whether the third pressure seal was opened and if it was opened, how much pressure it vented. The hot thermal storage medium may then be dispatched to the second HSC with the second pressure seal closed. The first pressure seal may then close and the load-lock 136 may repeat the cycle.

IV. Conclusion

While various aspects and embodiments have been disclosed herein, other aspects and embodiments will be apparent to those skilled in the art. For example, a load-lock may be configured to operate above and/or below atmospheric pressure regardless of whether it is on a cold-side or a hot-side of a system. As another example, other sealing methods are possible beyond those described, including both batch and continuous medium transfer. The various aspects and embodiments disclosed herein are for purposes of illustration and are not intended to be limiting, with the true scope and spirit being indicated by the following claims.

What is claimed is:

1. A system comprising:
   a thermal medium;
   a storage container configured to store the thermal medium at a first pressure;
   a heat exchanger containing the thermal medium at a second pressure that is different than the first pressure; and
   a load-lock disposed between the storage container and the heat exchanger, the load-lock comprising:
      a holding section configured to hold a quantity of the thermal medium;
      a first pressure seal disposed between the holding section and the storage container, wherein the first pressure seal in a closed configuration prevents equilibration of pressure between the holding section and the storage container through the first pressure seal and prevents transfer of the thermal medium between the storage container and the holding section through the first pressure seal, and wherein the first pressure seal in an open configuration allows equilibration of pressure between the holding section and the storage container through the first pressure seal and allows transfer of the thermal medium between the storage container and the holding section through the first pressure seal; and
      a second pressure seal disposed between the holding section and the heat exchanger, wherein the second pressure seal in a closed configuration prevents equilibration of pressure between the holding section and the heat exchanger through the second pressure seal and prevents transfer of the thermal medium between the heat exchanger and the holding section through the second pressure seal, and wherein the second pressure seal in an open configuration allows equilibration of pressure between the holding section and the heat exchanger through the second pressure seal and allows transfer of the thermal medium between the heat exchanger and the holding section through the second pressure seal.

2. The load-lock of claim 1 further comprising a third pressure seal, wherein the third pressure seal is operable to pressurize the holding section.

3. The load-lock of claim 1 further comprising a third pressure seal, wherein the third pressure seal is operable to vent pressure from the holding section.

4. The system of claim 1, wherein the thermal medium is a solid thermal medium.

5. The load-lock of claim 1, further comprising a conveyance system disposed between the first pressure seal and the second pressure seal, wherein the conveyance system is configured to transfer the solid thermal medium between the first pressure seal and the second pressure seal.

6. The load-lock of claim 5, wherein the conveyance system comprises an auger.

7. The system of claim 4, wherein the solid thermal medium comprises steel balls.

8. The system of claim 4, wherein the heat exchanger comprises a direct contact heat exchanger.

9. The system of claim 8, wherein the heat exchanger comprises a counterflow direct contact heat exchanger.

10. The system of claim 1, wherein the storage container is at atmospheric pressure.

11. The system of claim 1, wherein the heat exchanger contains the thermal medium at greater than atmospheric pressure.

12. The system of claim 11, wherein the heat exchanger contains the thermal medium at greater than 30 bar of pressure.

13. The system of claim 1, wherein the heat exchanger contains the thermal medium at less than atmospheric pressure.

14. The system of claim 1, wherein the load-lock further comprises a rotary bucket that includes the holding section and is configured to rotate through at least the following three positions:
   (i) first pressure seal is open, second pressure seal is closed;
   (ii) first pressure seal is closed, second pressure seal is closed; and
   (iii) first pressure seal is closed, second pressure seal is open.

15. A system comprising:
   a direct contact heat exchanger ("DCHE") configured to contact a cold working fluid to a hot solid thermal medium at greater than atmospheric pressure to form a hot working fluid and a cold thermal medium;
   a hot storage container ("HSC") configured to store the hot solid thermal medium at atmospheric pressure; and
   a load-lock coupling the DCHE and the HSC, the load-lock comprising:
      a holding section for the thermal storage medium;
      a first pressure seal between the holding section and the HSC; and
      a second pressure seal between the hot holding section and the DCHE,
      wherein the load-lock is configured to: receive the hot solid thermal medium into the holding section from the HSC with the first pressure seal open and the second pressure seal closed, wherein the HSC is at atmospheric pressure; retain the hot solid thermal medium within the holding section with the first pressure seal closed and the second pressure seal closed; and dispatch the hot thermal storage medium from the holding section to the DCHE with the first pressure seal closed and the second pressure seal open, wherein the DCHE is at greater than atmospheric pressure.

16. A system comprising:
   a compressor;
   a turbine;
   a first heat exchanger configured to operate at a first pressure;
   a second heat exchanger;
   a first thermal storage container configured to operate at a second pressure different than the first pressure;
   a second thermal storage container;
   a solid thermal medium;
   a load-lock disposed between the first heat exchanger and the first thermal storage container, wherein the load-lock is operable to transfer the solid thermal medium between the first heat exchanger and the first thermal storage container while preventing equilibration of pressure between the first heat exchanger and the first thermal storage container;
   a working fluid; and
   a working fluid flow path comprising a closed cycle including, in sequence, the compressor, the first heat exchanger, the turbine, and the second heat exchanger, wherein the system alternately operates as (i) a heat engine providing mechanical work from heat, and (ii) a heat pump using mechanical work to store heat.

17. The load-lock of claim 16 further comprising:
   a holding section;
   a first seal operable to equilibrate pressure between the holding section and the first thermal storage container; and
   a second seal operable to equilibrate pressure between the holding section and the first heat exchanger.

18. The load-lock of claim 17 further comprising a conveyance system disposed between the first pressure seal and the second pressure seal, wherein the conveyance system is configured to transfer the solid thermal medium between the first heat exchanger and the first thermal storage container.

19. The system of claim 16, wherein the first pressure is atmospheric pressure and the second pressure is greater than atmospheric pressure.

20. The load-lock of claim 16 further comprising a rotary bucket that includes the holding section.

* * * * *